United States Patent
Minegishi et al.

(10) Patent No.: US 11,342,751 B2
(45) Date of Patent: May 24, 2022

(54) POWER MANAGEMENT SYSTEM FOR CUSTOMER CONNECTED TO POWER NETWORK AND HAVING LOAD APPARATUS AND POWER STORAGE APPARATUS

(71) Applicant: PANASONIC INTELLECTUAL PROPERTY MANAGEMENT CO., LTD., Osaka (JP)

(72) Inventors: Akira Minegishi, Osaka (JP); Tetsuyoshi Ogura, Osaka (JP); Noriaki Takeda, Osaka (JP); Junichi Kanou, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 175 days.

(21) Appl. No.: 16/772,634

(22) PCT Filed: Dec. 4, 2018

(86) PCT No.: PCT/JP2018/044538
§ 371 (c)(1),
(2) Date: Jun. 12, 2020

(87) PCT Pub. No.: WO2019/116960
PCT Pub. Date: Jun. 20, 2019

(65) Prior Publication Data
US 2020/0389029 A1  Dec. 10, 2020

(30) Foreign Application Priority Data
Dec. 15, 2017  (JP) .............................. JP2017-240999

(51) Int. Cl.
*H02J 3/32* (2006.01)
*H02J 3/00* (2006.01)
(Continued)

(52) U.S. Cl.
CPC .............. *H02J 3/32* (2013.01); *G05B 19/042* (2013.01); *G06N 5/04* (2013.01); *G06N 20/00* (2019.01);
(Continued)

(58) Field of Classification Search
CPC .... H02J 3/32; H02J 3/004; H02J 3/381; H02J 7/007; H02J 2203/20; H02J 2300/22;
(Continued)

(56) References Cited

U.S. PATENT DOCUMENTS

2012/0232706 A1* 9/2012 Hayashida ................ H02J 3/14
700/282
2012/0323386 A1* 12/2012 Ito ........................... B60L 55/00
700/291
(Continued)

FOREIGN PATENT DOCUMENTS

JP  2007-143375 A  6/2007
JP  2010-022101 A  1/2010
(Continued)

OTHER PUBLICATIONS

English Translation of International Preliminary Report on Patentability issued in International Patent Application No. PCT/JP2018/044538, dated Jun. 25, 2020.
(Continued)

*Primary Examiner* — Lincoln D Donovan
*Assistant Examiner* — Alex W Lam
(74) *Attorney, Agent, or Firm* — McDermott Will & Emery LLP

(57) ABSTRACT

A long-term predictor predicts long-term predicted power indicating temporal changes in consumed power of a customer using a long-term prediction model. A short-term predictor predicts short-term predicted power indicating temporal changes in the consumed power of the customer
(Continued)

immediately after a current time, using a short-term prediction model, based on temporal changes in the consumed power of the customer immediately before the current time. A controller controls charging and discharging of a power storage apparatus at intervals based on the long-term predicted power and the short-term predicted power. The controller predicts temporal changes in charging power, discharging power, and charged electric energy of the power storage apparatus, and when the charged electric energy is predicted to reaches a lower limit due to discharging of the power storage apparatus, the controller charges power from the power network to the power storage apparatus in advance.

18 Claims, 19 Drawing Sheets

(51) Int. Cl.
| | |
|---|---|
| H02J 3/38 | (2006.01) |
| H02J 7/00 | (2006.01) |
| G06N 20/00 | (2019.01) |
| G05B 19/042 | (2006.01) |
| G06N 5/04 | (2006.01) |
| G06Q 50/06 | (2012.01) |

(52) U.S. Cl.
CPC .............. *G06Q 50/06* (2013.01); *H02J 3/004* (2020.01); *H02J 3/381* (2013.01); *H02J 7/007* (2013.01); *G05B 2219/2639* (2013.01); *H02J 2203/20* (2020.01); *H02J 2300/22* (2020.01)

(58) Field of Classification Search
CPC ........ H02J 3/466; H02J 3/003; G05B 19/042; G05B 2219/2639; G06N 5/04; G06N 20/00; G06N 3/0454; G06N 3/08; G06Q 50/06; Y04S 10/50
See application file for complete search history.

(56) References Cited

U.S. PATENT DOCUMENTS

| | | | |
|---|---|---|---|
| 2014/0222237 A1* | 8/2014 | Hibiya | H02J 3/383 |
| | | | 700/295 |
| 2019/0148780 A1* | 5/2019 | Wu | H02J 7/0036 |
| | | | 320/136 |

FOREIGN PATENT DOCUMENTS

| | | |
|---|---|---|
| JP | 5402566 B | 11/2013 |
| JP | 2016-015857 A | 1/2016 |
| WO | 2014-175374 A1 | 10/2014 |
| WO | 2017/217466 A1 | 12/2017 |

OTHER PUBLICATIONS

International Search Report issued in International Patent Application No. PCT/JP2018/044538, dated Feb. 19, 2019; with English translation.

* cited by examiner

POWER MANAGEMENT SYSTEM FOR CUSTOMER CONNECTED TO POWER NETWORK AND HAVING LOAD APPARATUS AND POWER STORAGE APPARATUS

CROSS-REFERENCE OF RELATED APPLICATIONS

This application is the U.S. National Phase under 35 U.S.C. § 371 of International Patent Application No. PCT/JP2018/044538, filed on Dec. 4, 2018, which in turn claims the benefit of Japanese Application No. 2017-240999, filed on Dec. 15, 2017, the entire disclosures of which Applications are incorporated by reference herein.

TECHNICAL FIELD

The present disclosure relates to a control apparatus for a power storage apparatus of a customer, the customer being connected to a power network and having a plurality of load apparatuses and at least one power storage apparatus. The present disclosure also relates to a power management system for such a customer, and to a power grid management system for a power grid including a plurality of such customers.

BACKGROUND ART

There is an electric power management system provided in a customer, the customer being connected to a power network (power delivery system) and having a plurality of load apparatuses and at least one power storage apparatus (see Patent Documents 1 to 3). The power management system may include the customer's power generator apparatus (such as solar cells).

CITATION LIST

Patent Documents

PATENT DOCUMENT 1: Japanese Patent Laid-open Publication No. JP 2016-015857 A
PATENT DOCUMENT 2: Japanese Patent No. JP 5402566 B
PATENT DOCUMENT 3: International Publication No. WO 2014/175374 A1

SUMMARY OF INVENTION

Technical Problem

When consumed power of any of the load apparatuses of the customer changes, overall consumed power of the customer also changes. For example, when one of the load apparatuses of the customer is turned on, the overall consumed power of the customer changes steeply. When a peak of received power from the power network exceeds a threshold specified in a contract with a power company, a unit price of an electricity rate increases. In addition, when received power from the power network steeply changes in response to steep changes in the overall consumed power of the customer, the quality of power transmitted through the power network degrades. Therefore, it is required to determine amounts of charging power and discharging power of the power storage apparatus so as to reduce the steep changes in the received power from the power network.

The present disclosure relates to a control apparatus for a storage apparatus of a customer, the customer being connected to a power network and having a plurality of load apparatuses and at least one power storage apparatus, the control apparatus determining amounts of charging power and discharging power of the power storage apparatus so as to reduce steep changes in received power from the power network.

The present disclosure also provides a power management system for such a customer, and also provides a power grid management system for a power grid including a plurality of such customers.

Solution to Problem

According to an aspect of the present disclosure, a control apparatus for at least one power storage apparatus in a customer, the customer being connected to a power network and having a plurality of load apparatuses and the at least one power storage apparatus, is provided. The control apparatus is provided with a first predictor a second predictor and a controller. The first predictor predicts first predicted power using a first prediction model indicating temporal changes in overall consumed power of the customer over a time interval, the first predicted power indicating temporal changes in the overall consumed power of the customer. The second predictor predicts second predicted power using a second prediction model indicating temporal changes in the overall consumed power of the customer over a first time period before and after consumed power of each of the plurality of load apparatuses changes, the second predicted power being predicted based on temporal changes in the overall consumed power of the customer over a second time period immediately before a current time, the second predicted power indicating temporal changes in the overall consumed power of the customer over a third time period immediately after the current time. The controller controls charging and discharging of the power storage apparatus so as to set a charging power or a discharging power every fourth time period based on the first predicted power, and set a charging power or a discharging power every fifth time period based on the second predicted power, the fifth time period being shorter than the third and fourth time periods. The controller predicts temporal changes in charging power, discharging power, and charged electric energy of the power storage apparatus, based on the first predicted power and the second predicted power, and when the charged electric energy is predicted to reaches a lower limit due to discharging of the power storage apparatus, the controller charges power from the power network to the power storage apparatus in advance.

Advantageous Effects of Invention

According to the present disclosure, in the customer connected to the power network and having the plurality of load apparatuses and the at least one power storage apparatus, it is possible to determine the amounts of charging power and discharging power of the power storage apparatus so as to reduce the steep changes in the received power from the power network.

Figure 1:
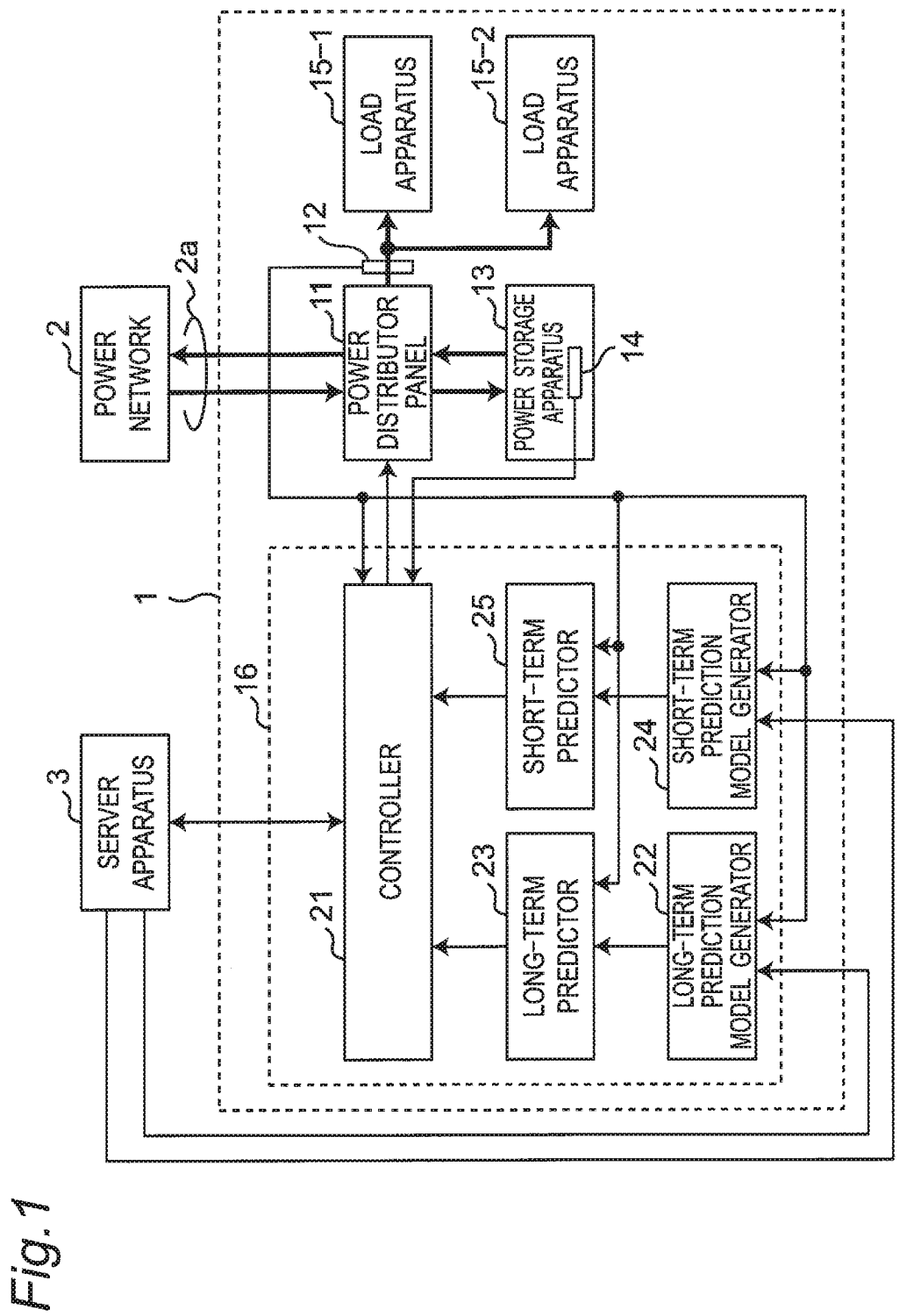
FIG. 1 is a block diagram illustrating a configuration of a power management system of a customer 1 according to a first embodiment.

DESCRIPTION OF EMBODIMENTS (Prehistory of Present Disclosure)

At first, we mention the circumstances leading the present inventors to achieve the present disclosure.

Feed-in Tariff Scheme (FIT) in Japan for renewable energy is scheduled to end in 2019. Therefore, it is expected that a customer provided with solar cells will consume more power generated by the customer itself, and more power storage apparatuses will be needed to efficiently consume the generated power.

A conventional electric power management system determines amounts of charging power and discharging power of an power storage apparatus in accordance with passive feedback control, for example, so as to achieve power balancing every 30 minutes, or in accordance with generated power of a power generator apparatus. The conventional electric power management system can not rapidly control the amounts of charging power and discharging power of the power storage apparatus in a cycle shorter than 30 minutes. In addition, the conventional electric power management system can not actively control the amounts of the powers, by considering a future consumed power, except when charging at night.

The power storage apparatus requires a high initial investment cost, and recovery of the investment cost is difficult, or takes a very long time. Accordingly, it is desired to maximize an effect of using the power storage apparatus on reduction of electricity costs.

For example, according to Patent Document 1, in order to maximize the effect of using the power storage apparatus on reduction of electricity costs, power supplied from the power network is reduced so as to reduce a base rate of the contracted electricity rate. Specifically, a peak power from the power network is reduced by controlling charging and discharging of the power storage apparatus in advance based on prediction data on consumed power, such that the power from the power network falls to or below an upper limit. For a time slot when the consumed power reaches, or is predicted to reach, an upper limit, a difference between the consumed power and the upper limit is stored in the power storage apparatus, before a time slot when the consumed power discharged from the power storage apparatus is predicted to exceed an upper limit, thus obtaining a required electric energy to be discharged.

In order to control the discharging power so as to follow steep changes in the consumed power, it is necessary to predict short-term temporal changes in the consumed power. The invention of Patent Document 1 only uses a prediction of the consumed power for each time slot, and therefore, can not follow short-term steep changes in the consumed power.

Accordingly, it is required to control charging and discharging of the power storage apparatus so to reduce steep changes in received power from the power network.

Based on the above findings and considerations, the present inventors have achieved aspects of the invention described below.

Hereinafter, embodiments of the present disclosure will be described with reference to the drawings. Additionally, in the following embodiments, similar components are denoted by the same reference signs.

First Embodiment

FIG. 1 is a block diagram illustrating a configuration of a power management system of a customer 1 according to a first embodiment. The customer 1 is provided with: a power distribution panel 11, a power meter 12, a power storage apparatus 13, a sensor 14, load apparatuses 15-1, 15-2, and a control apparatus 16. The customer 1 is connected to a power network 2 through a power line 2a, and further connected to a server apparatus 3. In the block diagrams of FIG. 1 and other drawings, a thick line indicates power, and a thin line indicates a control signal.

The power distribution panel 11 transmits power among the power network 2, the power storage apparatus 13, and the load apparatuses 15-1, 15-2, under control of the control apparatus 16. In some cases, the power distribution panel 11 transmits the power received from the power network 2 through the power line 2a, to the power storage apparatus 13 and/or the load apparatuses 15-1, 15-2. In other cases, the power distribution panel 11 transmits the power received from the power storage apparatus 13, to the load apparatuses 15-1, 15-2 and/or the power network 2.

The power meter 12 measures overall consumed power of the customer 1 (i.e., total consumed power of the load apparatuses 15-1, 15-2) and notifies the control apparatus 16 of the measured power.

The power storage apparatus 13 is charged with the received power from the power network 2, discharges the charging power and transmits the discharging power to the load apparatuses 15-1, 15-2 or the power network 2. The power storage apparatus 13 is provided with a battery, an AC-to-DC power converter circuit, and a DC-to-AC power converter circuit. The power storage apparatus 13 may include an electric vehicle.

The sensor 14 monitors the status of the power storage apparatus 13, such as the maximum charged electric energy, the current charged electric energy, and degradation. The sensor 14 notifies the control apparatus 16 of the status of the power storage apparatus 13.

Each of the load apparatuses 15-1, 15-2 is any electric equipment, such as lighting equipment, cooling/heating equipment, cooking equipment, a television apparatus, a personal computer, or an electric vehicle. Hereinafter, the load apparatuses 15-1, 15-2 are also collectively referred to as a load apparatus 15. FIG. 1 and other drawings illustrate only two load apparatuses 15-1, 15-2, but the customer 1 is provided with any number of load apparatuses.

The control apparatus 16 is provided with a controller 21, a long-term prediction model generator 22, a long-term predictor 23, a short-term prediction model generator 24, and a short-term predictor 25.

The controller 21 executes a power management process described later with reference to FIG. 7, to control charging and discharging of the power storage apparatus 13.

The long-term prediction model generator 22 generates a long-term prediction model indicating temporal changes in the overall consumed power of the customer 1 over a certain time interval. The long-term prediction model generator 22 generates the long-term prediction model, based on temporal changes in the overall consumed power of the customer 1, measured by the power meter 12. When generating the long-term prediction model, the long-term prediction model generator 22 may optionally use other information obtained from the server apparatus 3 (such as temporal changes in consumed power of other customers). The long-term prediction model is obtained by calculating an average of the overall consumed power of the customer 1 over several days, for example, for each time of day or each time slot of day (e.g., every 30 minutes or every one hour). In the long-term prediction model, for example, the average power for one day is predicted every hour with an error of 20% or less. The long-term prediction model may be obtained every day of the week, every month, and/or every season.

The long-term predictor 23 predicts a long-term predicted power using the long-term prediction model, the long-term predicted power indicating temporal changes in the overall consumed power of the customer 1. A time period in which the consumed power is predicted using the long-term prediction model is also referred to as a "long-term prediction period". The long-term prediction period is set to, for example, 24 hours. When a plurality of long-term prediction models have been generated by the long-term prediction model generator 22, the long-term predictor 23 may select the long-term prediction model closest to the current consumed power, based on the overall current consumed power of the customer 1 measured by the power meter 12.

In the present specification, the long-term prediction model is also referred to as a "first prediction model", the long-term predicted power is also referred to as a "first predicted power", the long-term prediction model generator 22 is also referred to as a "first prediction model generator", and the long-term predictor 23 is also referred to as a "first predictor".

The short-term prediction model generator 24 generates a short-term prediction model indicating temporal changes in the overall consumed power of the customer 1 over a first time period before and after the consumed power of each of the plurality of load apparatuses 15 changes. The short-term prediction model indicates, for example, temporal changes in the overall consumed power of the customer 1 over the first time period before and after each of the plurality of load apparatuses 15 is turned on. In addition, for example, when the load apparatus 15 has a plurality of operation modes with different consumed power, the short-term prediction model may indicate temporal changes in the overall consumed power of the customer 1 over the first time period before and after changing among the operation modes. For example, when the load apparatus 15 is cooling/heating equipment, cooking equipment, or the like, the plurality of operation modes correspond to a plurality of different temperature settings thereof. The consumed power of each of the plurality of load apparatuses 15 may be changed according to user operations, timer controls, or a predetermined sequence. The short-term prediction model is characterized by a magnitude of a peak consumed power, a duration during which a peak or average consumed power exceeds a threshold, a time slot when turning on the load apparatus 15, and the like. The short-term prediction model generator 24 generates the short-term prediction model based on temporal changes in the overall consumed power of the customer 1, measured by the power meter 12.

When generating the short-term prediction model, the short-term prediction model generator 24 may optionally use other information obtained from the server apparatus 3 (such as temporal changes in the consumed power of other customers).

The short-term predictor 25 predicts short-term predicted power using the short-term prediction model, based on temporal changes in the overall consumed power of the customer 1 over a second time period immediately before a current time, the short-term predicted power indicating temporal changes in the overall consumed power of the customer 1 over a third time period immediately after the current time. A time period in which the consumed power is predicted using the short-term prediction model (third time period) is also referred to as a "short-term prediction period". The short-term prediction period is set to, for example, one minute.

In the present specification, the short-term prediction model is also referred to as a "second prediction model", the short-term predicted power is also referred to as a "second predicted power", the short-term prediction model generator 24 is also referred to as a "second prediction model generator", and, the short-term predictor 25 is also referred to as a "second predictor".

The controller 21 controls charging and discharging of the power storage apparatus 13 so as to set charging power or discharging power every fourth time period, based on the long-term predicted power of the customer 1 predicted by the long-term predictor 23. The fourth time period is set to, for example, 30 minutes or one hour. Further, the controller 21 controls charging and discharging of the power storage apparatus 13 so as to set charging power or discharging power every fifth time period shorter than the third and fourth time periods, based on the short-term predicted power of the customer 1 predicted by the short-term predictor 25. The fifth time period is also referred to as "unit time period". The unit time period is set to, for example, one second.

As described above, the controller 21 controls charging and discharging of the power storage apparatus 13, based on both the long-term predicted power and the short-term predicted power. When controlling charging and discharging of the power storage apparatus 13, the controller 21 gives priority to the short-term predicted power over the long-term predicted power, so as to reduce steep changes in the received power from the power network 2 even when the overall consumed power of the customer 1 changes steeply.

Figure 2:
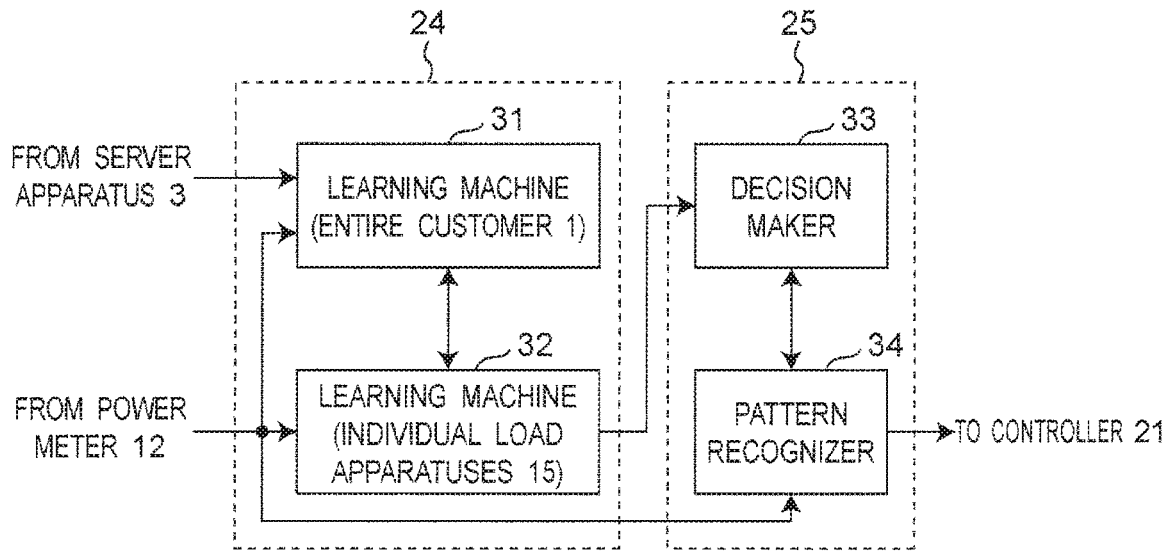
FIG. 2 is a block diagram illustrating a configuration of a short-term prediction model generator 24 and a short-term predictor 25 of FIG. 1.

FIG. 2 is a block diagram illustrating the configuration of the short-term prediction model generator 24 and the short-term predictor 25 of FIG. 1.

The short-term prediction model generator 24 is provided with a learning machine 31 and a learning machine 32. The learning machine 31 is trained with a model for the overall consumed power of the customer 1, based on temporal changes in the overall consumed power of the customer 1 measured by the power meter 12, and based on temporal changes in the consumed power of other customers obtained from the server apparatus 3. The learning machine 32 is trained with short-term prediction models for the consumed power of the individual load apparatuses 15, based on the temporal changes in the overall consumed power of the customer 1 measured by the power meter 12.

The learning machine 31 classifies patterns of the temporal changes in the consumed power of various load apparatuses, based on information of the temporal changes in the consumed power of various customers, and based on other information (e.g., information of the load apparatuses of other customers). The learning machine 31 determines whether or not the customer 1 is provided with the same load apparatus as that of another customer, based on the overall consumed power of the customer 1. In the case where the customer 1 is provided with a load apparatus having a known pattern of temporal changes in consumed power, it is possible to improve the learning efficiency and the learning accuracy of the learning machine 32 by considering the determined result of the learning machine 31. The learning machine 31 classifies the types of customers, including houses, shops, factories, and the like, based on information of the temporal changes in the consumed power of various customers, and based on other information. The learning machine 31 determines which type the customer 1 belongs to, based on the overall consumed power of the customer 1. In the case where the customer 1 belongs to a known type, it is possible to reduce the burden of detailed learning of the learning machine 32 by considering the determined result of the learning machine 31, thus improving learning efficiency and learning accuracy of the learning machine 32. The learning machine 32 is trained in detail with a pattern of temporal changes in the consumed power unique to the customer 1, based on the temporal changes in the overall consumed power of the customer 1, and generates the short-term prediction models corresponding to the individual load apparatuses 15. In addition, when the learning machine 31 considers the determined result of the learning machine 32, it is possible to improve learning efficiency and learning accuracy of the learning machine 31 for classifying patterns of temporal changes in consumed power of various load apparatuses, and for classifying the types of the customers.

The short-term predictor 25 is provided with a decision maker 33 and a pattern recognizer 34. The short-term prediction model generated by the learning machine 32 is set into the decision maker 33. Under control of the pattern recognizer 34, the decision maker 33 determines whether or not the temporal changes in the overall consumed power of the customer 1 measured by the power meter 12 match with the short-term prediction model generated by the learning machine 32. When the temporal changes in the overall consumed power of the customer 1 match with the beginning portion of a short-term prediction model, the pattern recognizer 34 notifies the controller 21 of the temporal changes in the overall consumed power of the customer 1 indicated by a subsequent portion of the same short-term prediction model.

Each of the learning machines 31, 32 and the decision maker 33 in FIG. 2 may be provided with a neural network.

Figure 3:
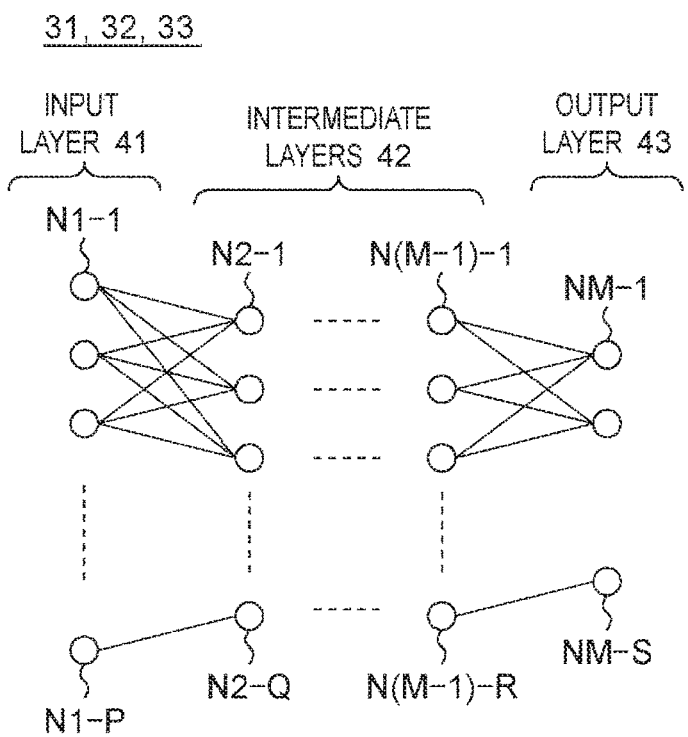
FIG. 3 is a diagram illustrating an example of a neural network used in each of learning machines 31, 32, and a decision maker 33 of FIG. 2.

FIG. 3 is a diagram illustrating an example of the neural network used in each of the learning machines 31, 32 and the decision maker 33 of FIG. 2. The neural network is provided with nodes N1-1 to N1-P of an input layer 41, nodes N2-1 to N2-Q, . . . , N(M-1)-1 to N(M-1)-R of at least one intermediate layer 42, and nodes NM-1 to NM-S of an output layer 43. Into the input layer 41 of the neural network of the learning machine 32, time-series data indicating temporal changes in the overall consumed power of the customer 1, with a duration (second time period) shorter than the duration of the short-term prediction model to be generated, is set. Into the output layer 43 of the neural network of the learning machine 32, time-series data indicating temporal changes in the overall consumed power of the customer 1, with the duration (first time period) of the short-term prediction model to be generated, is set. The short-term prediction model learned by the learning machine 32, that is, the weight coefficients of the intermediate layer 42 are set into the intermediate layer 42 of the neural network of the decision maker 33. Into the input layer 41 of the neural network of the decision maker 33, time-series data indicating temporal changes in the overall consumed power of the customer 1, with the same duration (second time period) as that of the time-series data inputted to the input layer 41 of the neural network of the learning machine 32, is inputted. From the output layer 43 of the neural network of the decision maker 33, time-series data indicating temporal changes in the overall consumed power of the customer 1, with the duration (first time period) of the short-term prediction model, is outputted. In the case where the time-series data inputted to the input layer 41 of the neural network of the decision maker 33 matches with the beginning portion of a short-term prediction model, time-series data indicating temporal changes in the overall consumed power of the customer 1, indicated by the entire of the same short-term prediction model, is outputted from the output layer 43 of the neural network of the decision maker 33.

Into the input layer 41 in the neural network of each of the learning machine 32 and the decision maker 33 of FIG. 2, other data as described below may be further inputted, for example, by the server apparatus 3 or the controller 21.

Into the input layer 41, data indicating the type of the customer 1, such as a house, a shop, a factory, or the like, may be further inputted. Using such data, it is possible to estimate the model and the consumed power of each load apparatus 15, a time slot in which each load apparatus 15 is operated, and the like, thus improving the accuracy of learning and prediction.

Into the input layer 41, data indicating a number of users of the customer 1 or family members of the customer 1 may be further inputted. Using such data, it is possible to estimate a time slot in which each load apparatus 15 is operated, thus improving the accuracy of learning and prediction.

Into the input layer 41, data indicating the model or model number of each load apparatus 15 may be further inputted. Using such data, it is possible to estimate the consumed power and the like of each load apparatus 15, thus improving the accuracy of learning and prediction.

Into the input layer 41, data indicating ON/OFF status or the consumed power of each load apparatus 15 may be further inputted (see the third embodiment described later).

Into the input layer 41, data indicating behavior of a user of the customer 1 may be further inputted. Using such data, it is possible to estimate a time slot in which each load apparatus 15 is operated, thus improving the accuracy of learning and prediction. For example, in order to obtain data indicating the behavior of a user of the customer 1, the server apparatus 3 may extract data about when, how, and which load apparatus 15 is used by the user, from the user's postings to social network services.

Into the input layer 41, data indicating the weather, such as weather forecast and current temperature, may be further inputted. Using such data, it is possible to estimate, for example, a consumed power and a time slot in which the load apparatus 15 as an air conditioner is operated, thus improving accuracy of learning and prediction.

Into the input layer 41, data indicating the date and time, or the day of the week may be further inputted. Using such data, it is possible to estimate a time slot in which each load apparatus 15 is operated, based on information about an event to be held on a particular day of the week, a seasonal event, or the like, thus improving the accuracy of learning and prediction.

Figure 4:
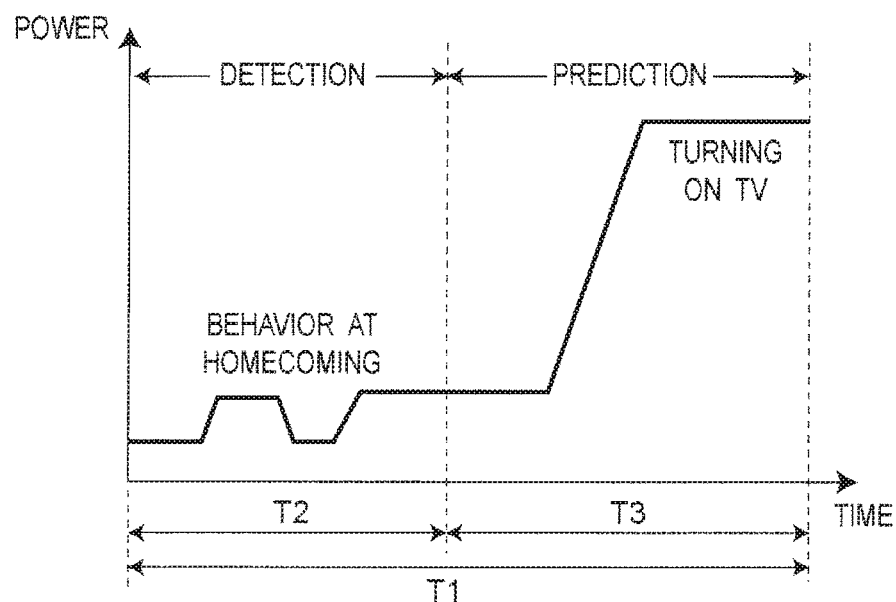
FIG. 4 is a diagram illustrating a first exemplary short-term prediction model used in the short-term predictor 25 of FIG. 1.
Figure 5:
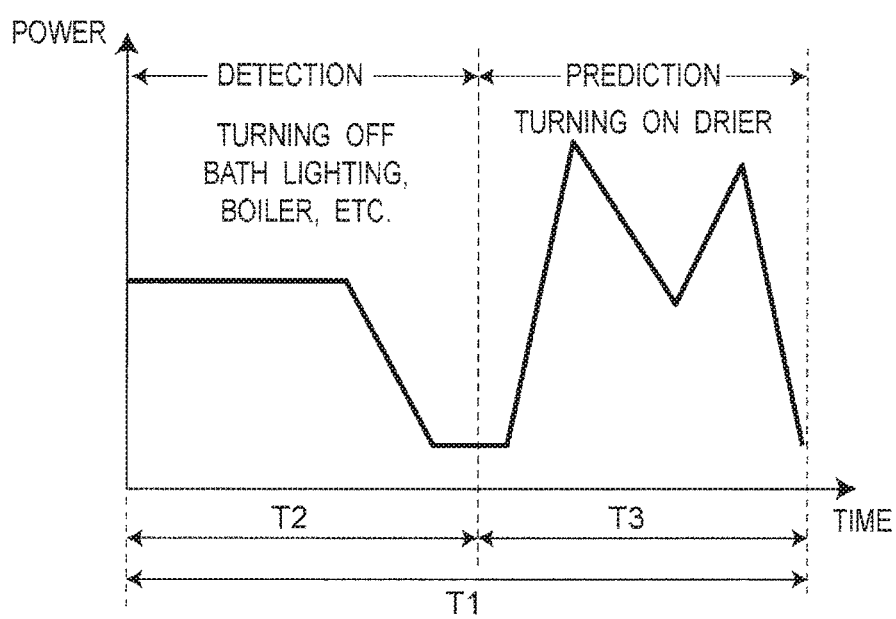
FIG. 5 is a diagram illustrating a second exemplary short-term prediction model used in the short-term predictor 25 of FIG. 1.
Figure 6:
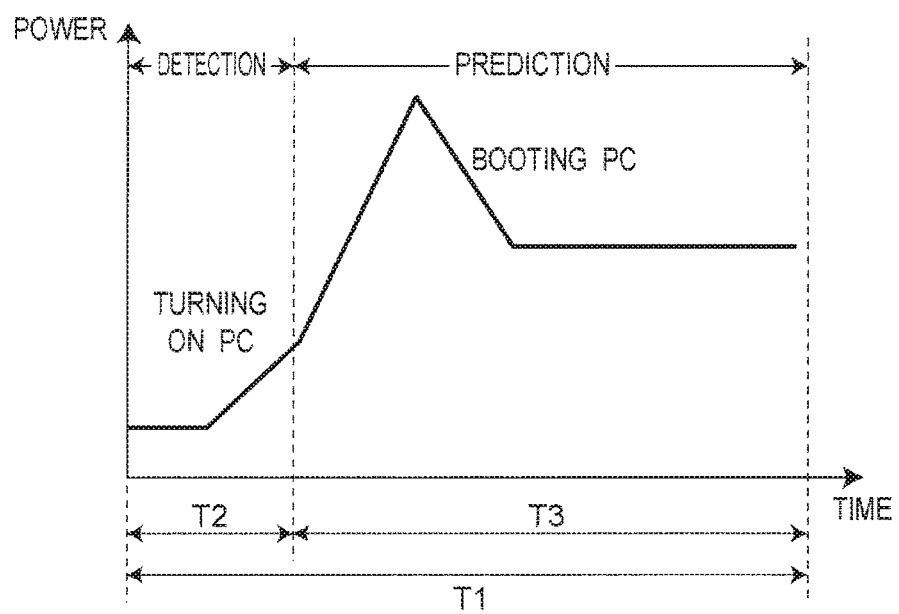
FIG. 6 is a diagram illustrating a third exemplary short-term prediction model used in the short-term predictor 25 of FIG. 1.

With reference to FIGS. 4 to 6, exemplary short-term prediction models used in the short-term predictor 25 of FIG. 1 will be described.

FIG. 4 is a diagram illustrating a first exemplary short-term prediction model used in the short-term predictor 25 of FIG. 1. For example, consider a case where, when a user comes home at most weekday nights, the user firstly turns on lighting equipment or the like, and then turns on a television apparatus (TV). By detecting turning on of the lighting equipment or the like, it is possible to predict that the television apparatus would be then turned on. In this case, the controller circuit 21 controls discharging of the power storage apparatus 13 by setting discharging power according to consumed power of the television apparatus.

FIG. 5 is a diagram illustrating a second exemplary short-term prediction model used in the short-term predictor 25 of FIG. 1. For example, suppose a case where, often after a user takes a bath, the user turns off a bath lighting and a boiler, and then turns on a hair dryer. By detecting turning off of the bath lighting and the boiler, it is possible to predict that the hair dryer would be then turned on. In this case, the controller circuit 21 controls discharging of the power storage apparatus 13 by setting discharging power according to consumed power of the hair dryer.

FIG. 6 is a diagram illustrating a third exemplary short-term prediction model used in the short-term predictor 25 of FIG. 1. For example, suppose a case where, when starting up a personal computer (PC), the PC runs a booting process with relatively low consumed power immediately after turning on the PC, and then transitions to an active state with higher consumed power. By detecting the boot process immediately after turning on the PC, it is possible to predict consumed power thereafter. In this case, the controller circuit 21 controls discharging of the power storage apparatus 13 by setting discharging power according to the predicted consumed power.

In FIGS. 4 to 6, symbol T1 denotes a time period of the short-term prediction model (first time period). Symbol T2 denotes a time period of time-series data indicating temporal changes in the overall consumed power of the customer 1 immediately before the current time, to be applied to the short-term prediction model (second time period). Symbol T3 denotes a short-term prediction period, that is, a time period of the short-term predicted power that is predicted (third time period).

When setting charging power or discharging power based on the short-term predicted power predicted by the short-term predictor 25, the controller 21 sets an upper limit of the charging power or the discharging power, or an upper limit and a lower limit of the charged electric energy (i.e., remaining capacity), based on the long-term predicted power predicted by the long-term predictor 23. Even when the charged electric energy is not sufficient to completely cancel an increase in consumed power over an entire time period when the load apparatus 15 is turned on, the power storage apparatus 13 is discharged so as to reduce a peak of received power to some extent over this time period. In other words, a future charging and discharging plan serves as a restriction on the current charging power and discharging power, and thus, it is possible to optimally control charging and discharging of the power storage apparatus 13, while considering immediate and future conditions.

When the load apparatus 15 is turned on or off in response to unexpected behavior of a user of the customer 1 (such as staying up late) or an unexpected visitor, or when the load apparatus 15 fails, the overall consumed power of the customer 1 may change steeply. When the received power from the power network 2 steeply changes in response to the steep change in the overall consumed power of the customer 1, the quality of the power transmitted through the power network 2 may degrade. Hence, it is required to control charging and discharging of the power storage apparatus 13 so as to reduce the steep changes in the received power from the power network 2.

In addition, due to unexpected behavior of a user of the customer 1 or an unexpected visitor, the overall consumed power of the customer 1 in the short-term prediction period may become larger than the consumed power predicted as the long-term predicted power, and as a result, there may be a deficiency in the charged electric energy of the power storage apparatus 13. When the charged electric energy of the power storage apparatus 13 reaches the lower limit, the customer 1 thereafter has to receive power from the power network 2 in accordance with the overall consumed power of the customer 1. In this case, the received power from the power network 2 may change steeply in response to steep changes in the overall consumed power of the customer 1, and the received power from the power network 2 may exceed the upper limit specified in a contract with the power company. Hence, it is required to control charging and discharging of the power storage apparatus 13 so that a deficiency in the charged electric energy is less likely to occur.

Next, with reference to FIGS. 7 to 11, a power management process executed by the controller 21 of FIG. 1 will be described.

Figure 7:
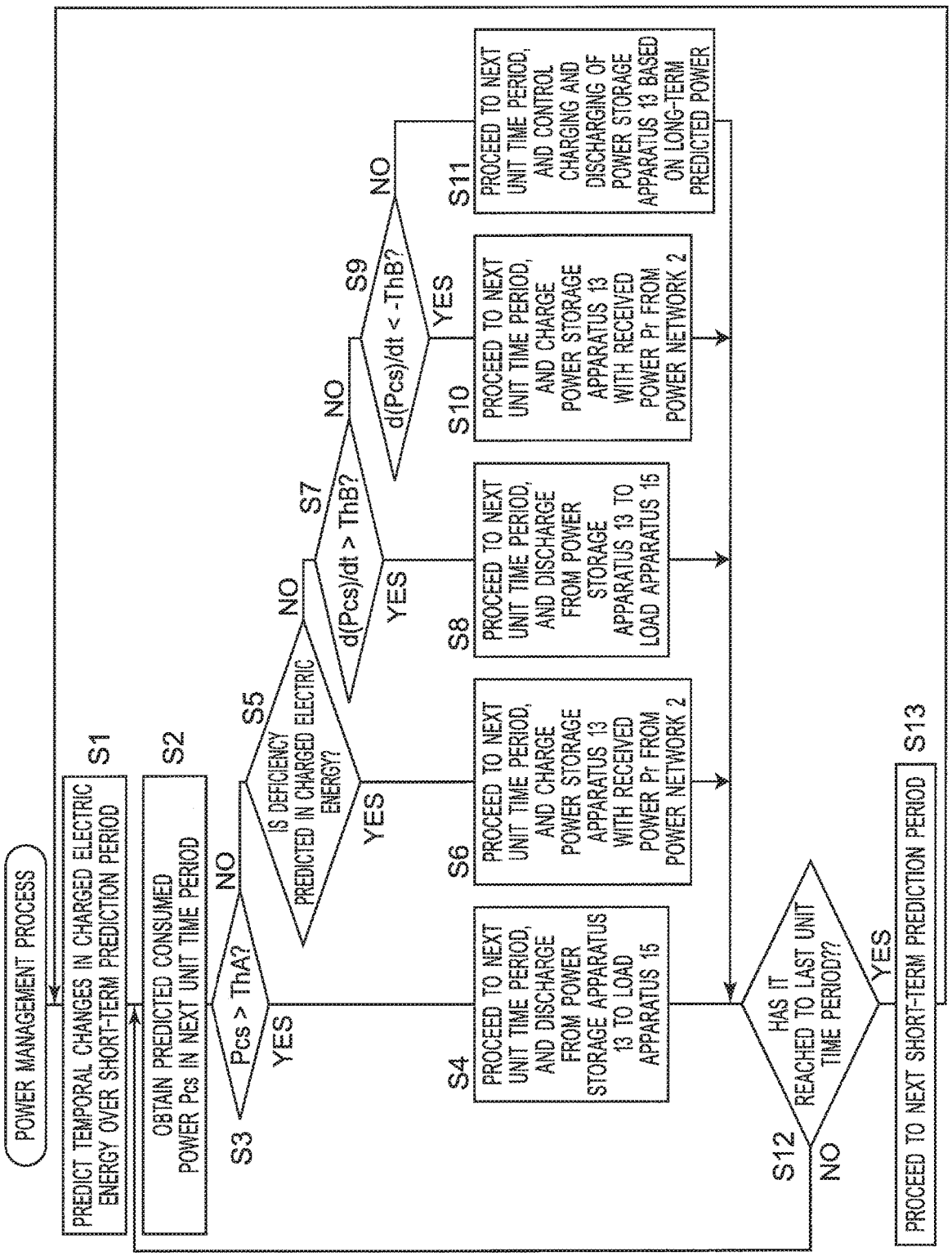
FIG. 7 is a flowchart illustrating a power management process executed by a controller 21 of FIG. 1.

FIG. 7 is a flowchart illustrating the power management process executed by the controller 21 of FIG. 1.

In step S1 of FIG. 7, the controller 21 obtains the long-term predicted power and the short-term predicted power in the short-term prediction period immediately after the current time (or the short-term prediction period including the current time), from the long-term predictor 23 and the short-term predictor 25, respectively. Further, the controller 21 predicts temporal changes in the charging power, the discharging power, and the charged electric energy of the power storage apparatus 13 over the short-term prediction period, based on the long-term predicted power and the short-term predicted power. As described above, the controller 21 controls charging and discharging of the power storage apparatus 13 every unit time period shorter than the short-term prediction period. In step S2, the controller 21 obtains predicted overall consumed power Pcs of the customer 1 in the next unit time period, from the short-term predicted power obtained in step S1.

In step S3, the controller 21 determines whether or not the consumed power Pcs in the next unit time period exceeds a threshold power ThA; if YES, the process proceeds to step S4, and if NO, the process proceeds to step S5. The threshold power ThA indicates, for example, an upper limit of received power Pr from the power network 2, the upper limit being specified in a contract with the power company. In step S4, the controller 21 proceeds to the next unit time period, and then, supplies the received power Pr equal to the threshold power ThA, from the power network 2 to the load apparatus 15, and discharges deficient power for the consumed power Pcs, from the power storage apparatus 13 to the load apparatus 15.

Figure 8:
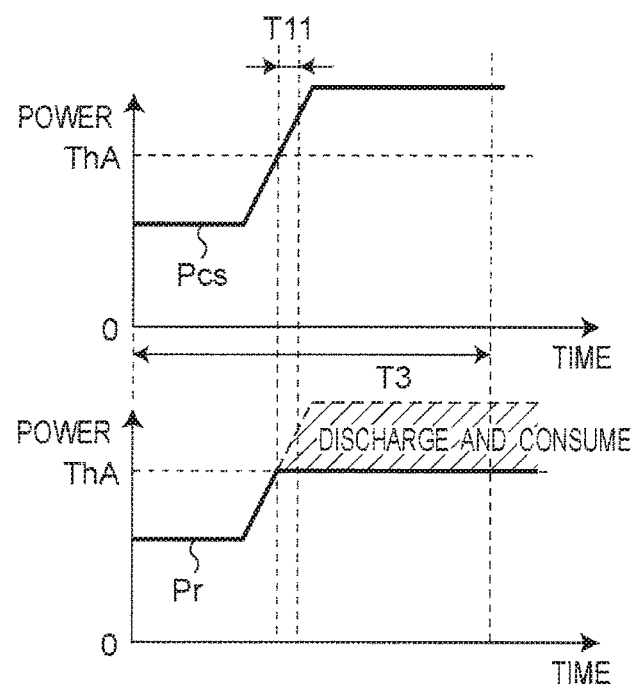
FIG. 8 is a graph illustrating an operation to be done in the customer 1 of FIG. 1, when consumed power Pcs exceeds a threshold power ThA of received power Pr.

FIG. 8 is a graph illustrating an operation to be done in the customer 1 of FIG. 1, when the consumed power Pcs exceeds the threshold power ThA of the received power Pr. In FIG. 8 and other drawings, symbol T11 denotes the current unit time period. As shown in the top of FIG. 8, the consumed power Pcs may exceed the threshold power ThA in a certain unit time period T11. In the case of receiving power from the power network 2 in excess of the threshold power ThA in accordance with the increase in the consumed power Pcs, the unit price of the electricity cost increases as described above. Therefore, as shown in the bottom of FIG. 8, when the consumed power Pcs is predicted to exceed the threshold power ThA, the controller 21 discharges power from the power storage apparatus 13 to the load apparatus 15, while the consumed power Pcs exceeds the threshold power ThA. Thus, it is possible to keep the amount of the received power Pr equal to or smaller than the threshold power ThA.

In step S5 of FIG. 7, the controller 21 determines whether or not a deficiency in the charged electric energy of the power storage apparatus 13 is predicted in the short-term prediction period; if YES, the process proceeds to step S6, and if NO, the process proceeds to step S7. In step S6, the controller 21 proceeds to the next unit time period, and charges power from the power network 2 to the power storage apparatus 13, while supplying the power equal to the consumed power Pcs from the power network 2 to the load apparatus 15.

Figure 9:
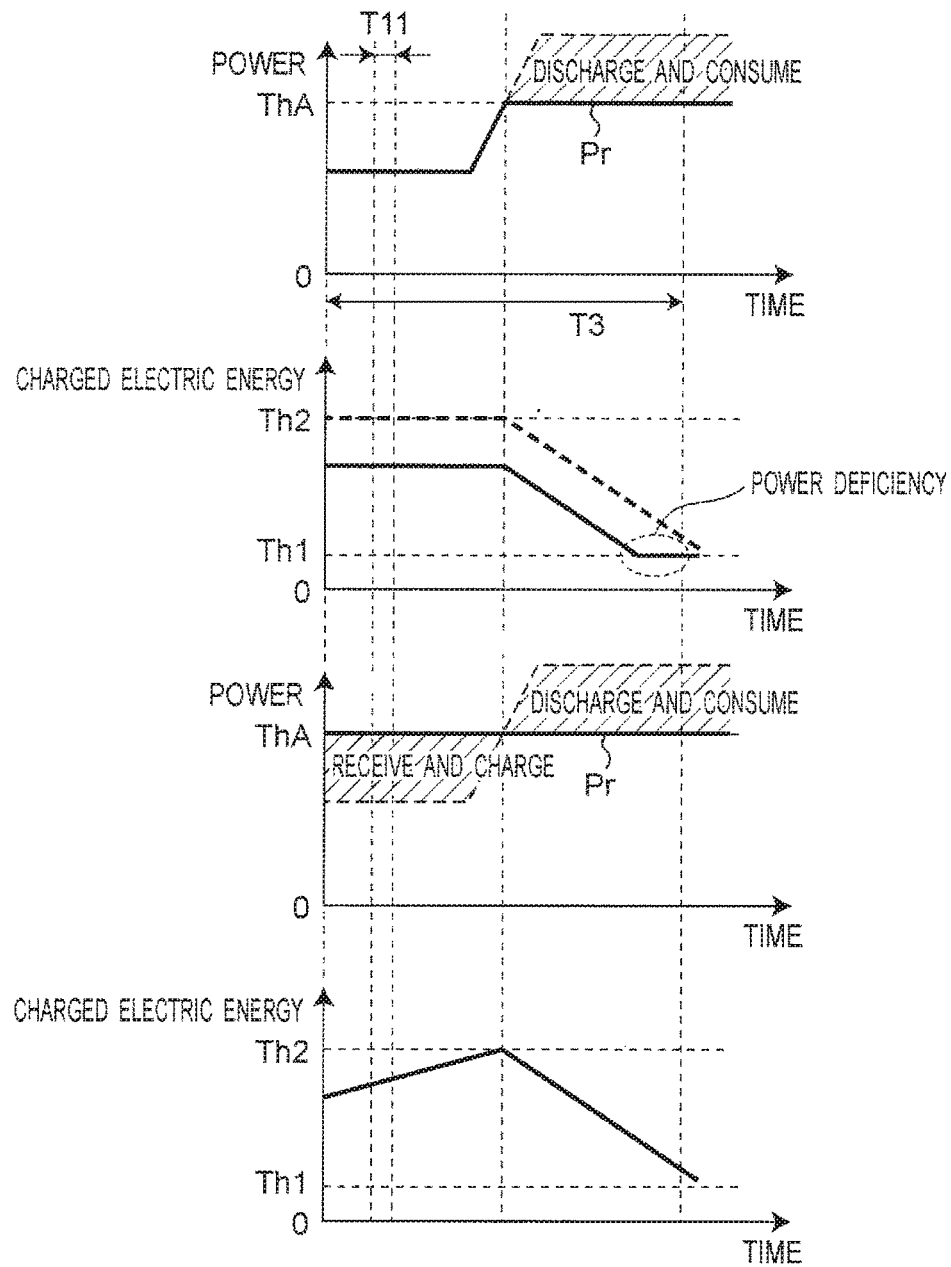
FIG. 9 is a graph illustrating an operation to be done in the customer 1 of FIG. 1, when charged electric energy of a power storage apparatus 13 reaches a lower limit Th1 due to discharging.

FIG. 9 is a graph illustrating an operation to be done in the customer 1 of FIG. 1, when the charged electric energy of the power storage apparatus 13 reaches a lower limit Th1 due to discharging. The power storage apparatus 13 has a lower limit Th1 and an upper limit Th2 of the charged electric energy, these limits being determined in accordance with the upper limit of the charging power or the discharging power, the limit being set based on the long-term predicted power. When discharging power from the power storage apparatus 13 as shown in the first graph of FIG. 9, the charged electric energy of the power storage apparatus 13 may reach the lower limit Th1 as shown in the second graph of FIG. 9. Accordingly, as shown in the third graph of FIG. 9, when the charged electric energy is predicted to reach the lower limit Th1 due to discharging of the power storage apparatus 13, the controller 21 charges power from the power network 2 to the power storage apparatus 13 in advance, in the current unit time period T11. Thus, as shown in the fourth graph of FIG. 9, the charged electric energy is less likely to reach the lower limit Th1 even when discharging the power storage apparatus 13.

In step S7 of FIG. 7, the controller 21 calculates a change rate of the consumed power Pcs, i.e., d(Pcs)/dt. Further, the controller 21 determines whether or not the change rate d(Pcs)/dt is higher than a positive threshold rate ThB; if YES, the process proceeds to step S8, and if NO, the process proceeds to step S9. The threshold rate ThB indicates, for example, an upper limit of an allowable change rate of the power transmitted through the power network 2. In step S8, the controller 21 proceeds to the next unit time period, and discharges deficient power for the consumed power Pcs from the power storage apparatus 13 to the load apparatus 15, while maintaining the amount of the received power Pr from the power network 2.

Figure 10:
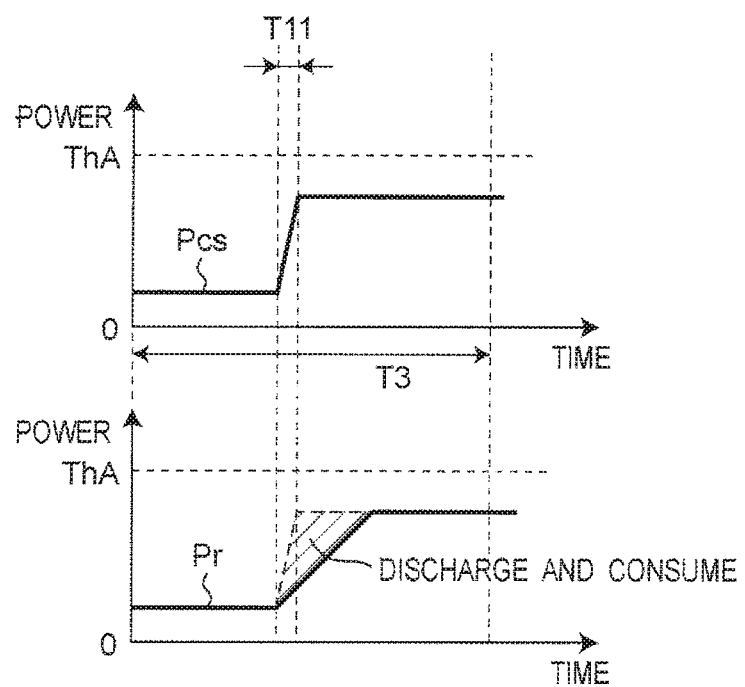
FIG. 10 is a graph illustrating an operation to be done in the customer 1 of FIG. 1, when the consumed power Pcs increases steeply.

FIG. 10 is a graph illustrating an operation to be done in the customer 1 of FIG. 1, when the consumed power Pcs increases steeply. As shown in the top of FIG. 10, the consumed power Pcs may increase steeply. In the case where the received power Pr from the power network 2 steeply increases due to the steep increase in the consumed power Pcs, the quality of the power transmitted through the power network may degrade. Therefore, as shown in the bottom of FIG. 10, when the consumed power Pcs is predicted to increase steeply, the controller 21 begins to discharge power from the power storage apparatus 13 to the load apparatus 15 at the moment of the steep increase in the consumed power Pcs (unit time period T11). After the steep increase in the consumed power Pcs, the controller 21 gradually increases the received power Pr and gradually reduces the discharging power in accordance with the consumed power Pcs. Thus, the received power Pr is less likely to increase steeply.

In step S9 of FIG. 7, the controller 21 determines whether or not the change rate of the consumed power Pcs, i.e., d(Pcs)/dt, is lower than a negative threshold rate −ThB; if YES, the process proceeds to step S10, and if NO, the process proceeds to step S11. In step S10, the controller 21 proceeds to the next unit time period, and charges excess power of the received power Pr over the consumed power Pcs, to the power storage apparatus 13, while maintaining the amount of the received power Pr from the power network 2.

Figure 11:
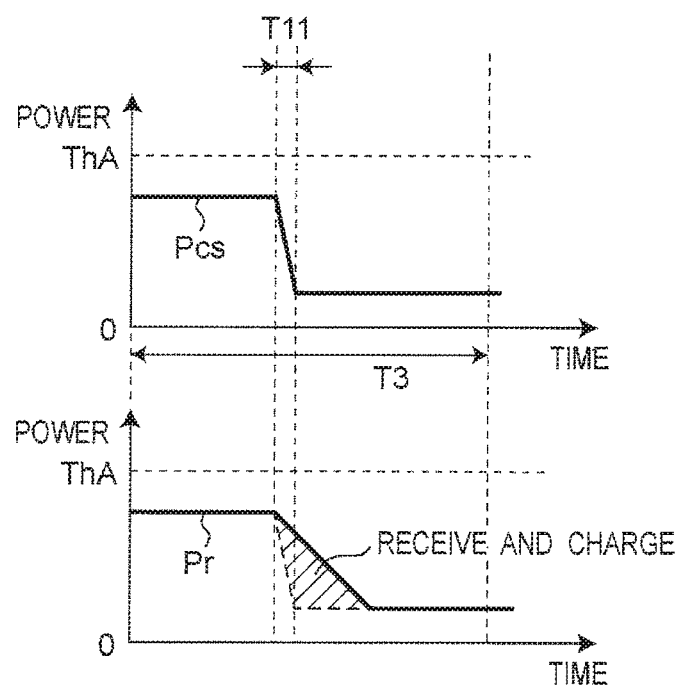
FIG. 11 is a graph illustrating an operation to be done in the customer 1 of FIG. 1, when the consumed power Pcs decreases steeply.

FIG. 11 is a graph illustrating an operation to be done in the customer 1 of FIG. 1, when the consumed power Pcs decreases steeply. As shown in the top of FIG. 11, the consumed power Pcs may decrease steeply. In the case where the received power Pr from the power network 2 steeply decreases due to the steep decrease in the consumed power Pcs, the quality of the power transmitted through the power network may degrade. Therefore, as shown in the bottom of FIG. 11, when the consumed power Pcs is predicted to decrease steeply, the controller 21 begins to charge power from the power network 2 to the power storage apparatus 13 at the moment of the steep decrease in the consumed power Pcs (unit time period T11). After the steep decrease in the consumed power Pcs, the controller 21 gradually reduces the charging power (i.e., the received power Pr) in accordance with the consumed power Pcs. Thus, the received power Pr is less likely to decrease steeply.

In step S11 of FIG. 7, the controller 21 proceeds to the next unit time period, and controls charging and discharging of the power storage apparatus 13 based on the long-term predicted power.

In step S12, the controller 21 determines whether or not to have reached the last unit time period in the unit prediction period; if YES, the process proceeds to step S13, and if NO, the process returns to step S2. In step S13, the controller 21 proceeds to the next short-term prediction period, and the process returns to step S1.

Next, with reference to FIG. 12 to FIG. 14, advantageous effects of the power management system of the first embodiment will be described.

Figure 12:
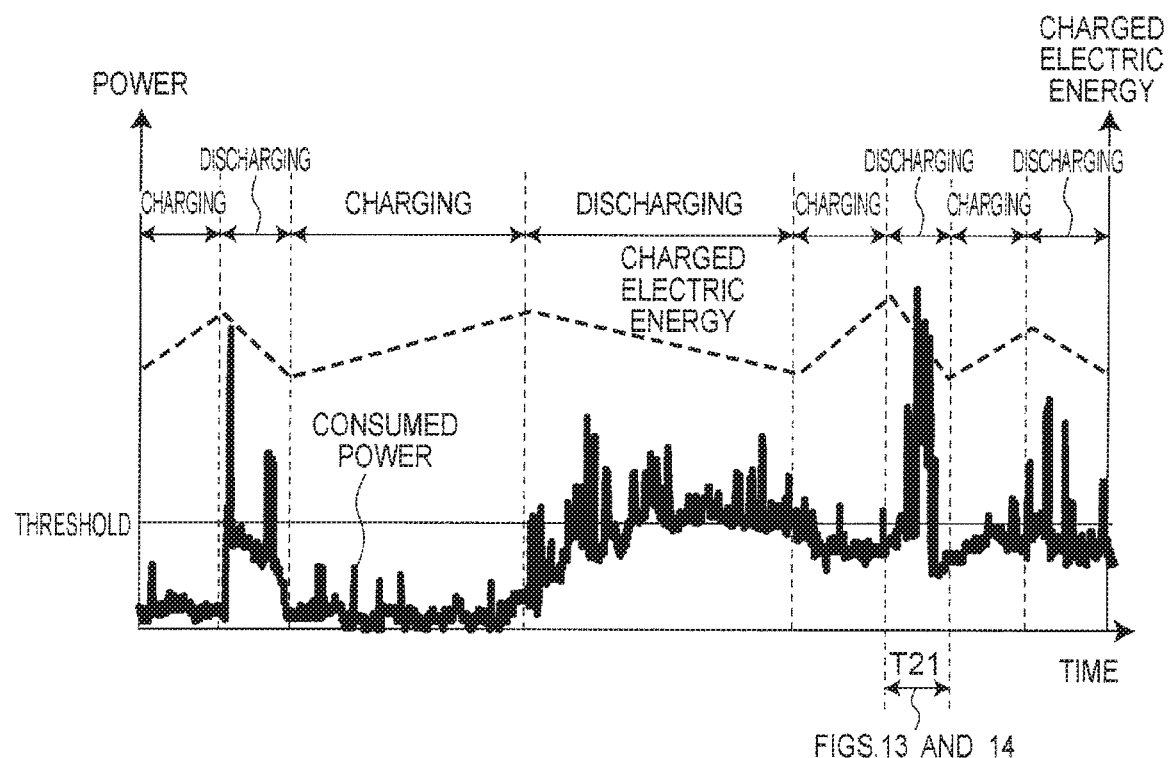
FIG. 12 is a graph illustrating temporal changes in overall consumed power of the customer 1 of FIG. 1.

FIG. 12 is a graph illustrating temporal changes in the overall consumed power of the customer 1 of FIG. 1. FIG. 12 further illustrates the control on charging and discharging of the power storage apparatus 13 based on the long-term prediction model. When the overall consumed power of the customer 1 is predicted to be less than the threshold of FIG. 12, the control apparatus 16 supplies the received power from the power network 2, to the load apparatus 15, and further charges the received power to the power storage apparatus 13. When the overall consumed power of the customer 1 is predicted to be equal to or greater than the threshold in FIG. 12, the control apparatus 16 supplies the received power from the power network 2, to the load apparatus 15, and further supplies the power discharged from the power storage apparatus 13, to the load apparatus 15. The control apparatus 16 predicts the amount of power to be discharged and charges the power to the power storage apparatus 13 in advance, before the time period in which the overall consumed power of customer 1 is predicted to be equal to or greater than the threshold of FIG. 12. As described above, by using the long-term prediction model, it is possible to optimize the charged electric energy and discharged electric energy.

Figure 13:
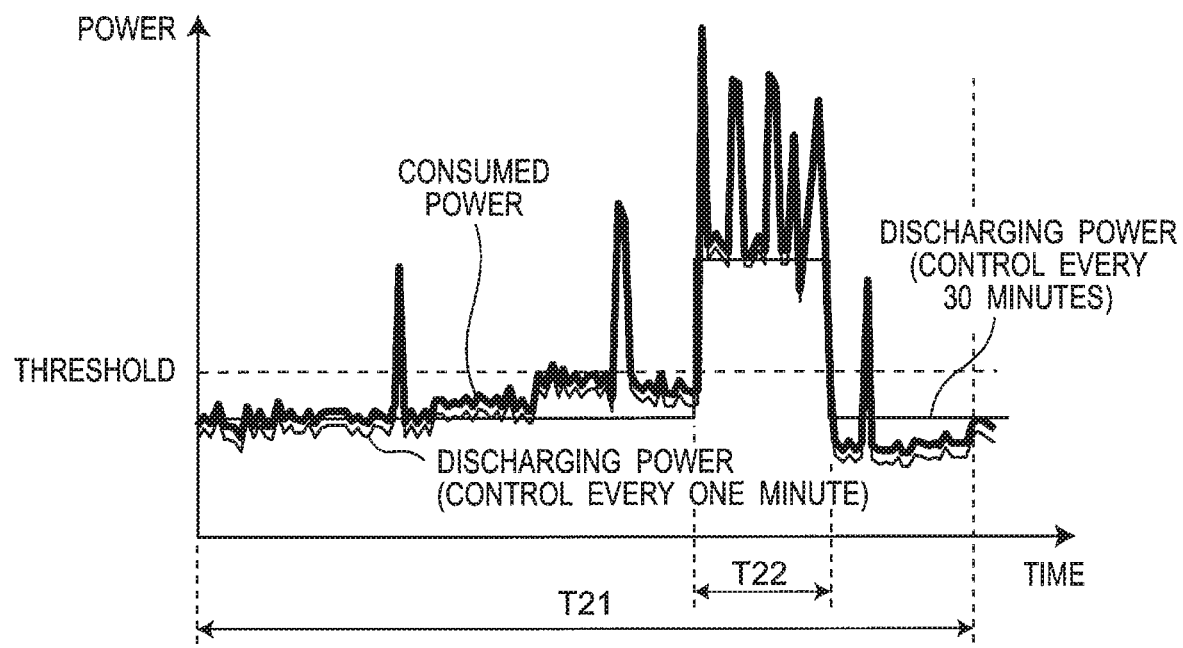
FIG. 13 is a graph illustrating temporal changes in the overall consumed power of the customer 1 of FIG. 1 and in discharging power of the power storage apparatus 13.
Figure 14:
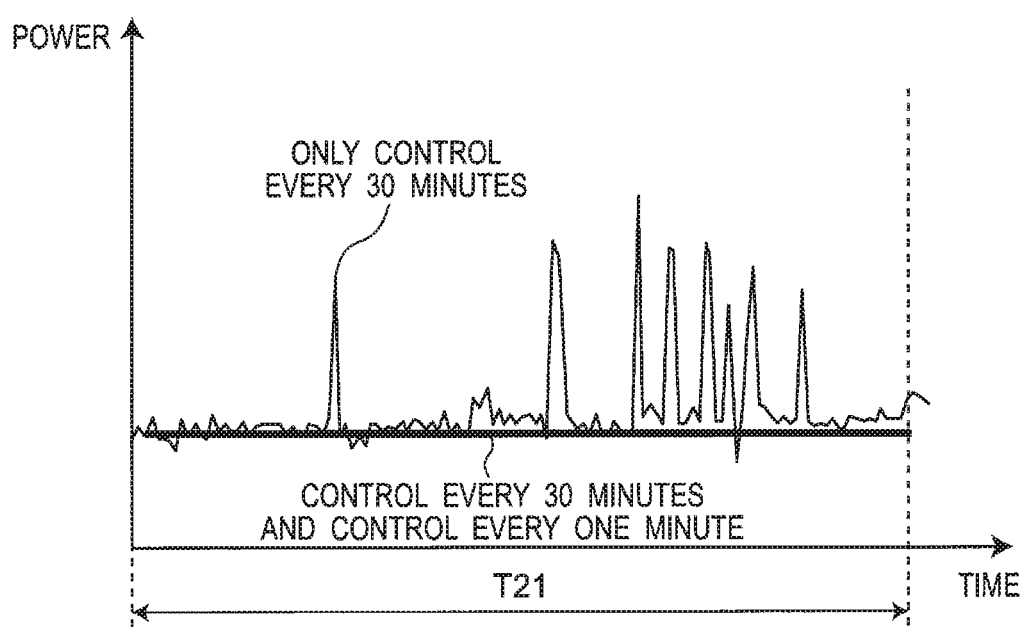
FIG. 14 is a graph illustrating temporal changes in received power of the customer 1 of FIG. 1 from a power network 2.

FIG. 13 is a graph illustrating temporal changes in the overall consumed power of the customer 1 of FIG. 1 and in the discharging power of the power storage apparatus 13. FIG. 14 is a graph illustrating temporal changes in the received power of the customer 1 of FIG. 1 from the power network 2. The received power of the customer 1 from the power network 2 is the remainder obtained by subtracting the discharging power of the power storage apparatus 13 from the overall consumed power of the customer 1. FIGS. 13 and 14 correspond to a time period T21 of FIG. 12. The control apparatus 16 controls charging and discharging of the power storage apparatus 13, based on the long-term prediction model, so as to achieve, for example, power balancing every 30 minutes (indicated as "CONTROL EVERY 30 MINUTES" in FIGS. 13 and 14). Thus, for example, in a time period T22 of FIG. 13, the discharging power is increased in accordance with a temporary increase in consumed power. When using only the control every 30 minutes, the amount of the discharging power can not follow temporal changes in consumed power in a time period shorter than 30 minutes. In this case, as shown in FIG. 14, as seen from the power network 2, steep changes in the overall consumed power of the customer 1 affect the power network 2, and degrades the quality of the power transmitted through the power network 2. On the other hand, in a case of controlling charging and discharging of the power storage apparatus 13 based on the short-term prediction model (indicated as "CONTROL EVERY ONE MINUTE" in FIGS. 13 and 14) in addition to the long-term prediction model, it is possible to control the amounts of the charging power and the discharging power so as to follow steep changes in the overall consumed power of the customer 1. Therefore, in this case, steep changes in the overall consumed power of the customer 1 are less likely to affect the power network 2, as shown in FIG. 14, thus stabilizing the power of the power network 2.

According to the power management system of the first embodiment, it is possible to reduce steep changes in the received power from the power network 2, by rapidly controlling charging and discharging of the power storage apparatus 13 every unit time period based on the short-term predicted power. By reducing steep changes in the received power from the power network 2, the quality of the power transmitted through the power network 2 is less likely to degrade.

According to the power management system of the first embodiment, a deficiency in the charged electric energy of the power storage apparatus 13 is less likely to occur, by rapidly controlling charging and discharging of the power storage apparatus 13 every unit time period based on the short-term predicted power. The received power from the power network 2 is less likely to change steeply, while satisfying the restriction on the charged electric energy, the restriction being based on the long-term predicted power.

According to the power management system of the first embodiment, even when the overall consumed power of the customer 1 deviates from the consumed power predicted as the long-term predicted power, it is possible to control charging and discharging of the power storage apparatus 13 so as to reduce steep changes in the received power from the power network 2, based on the short-term predicted power.

According to the power management system of the first embodiment, by using the short-term prediction model, it is possible to control charging and discharging of the power storage apparatus 13 so as to follow changes in the consumed power. As a result, it is possible to reduce the amount of received power from the power network 2, thus reducing the electricity cost. According to the power management system of the first embodiment, it is possible to use the power storage apparatus 13 more efficiently than the prior art by controlling charging and discharging of the power storage apparatus 13 based on both the long-term predicted power and the short-term predicted power. Therefore, it is possible to maximize an effect of using the power storage apparatus 13 on reduction of electricity costs.

According to the power management system of the first embodiment, since steep changes in the received power from the power network 2 is reduced by the customer 1, complicated processes by the power network 2, such as a demand response, are not needed.

In order to control discharging of the power storage apparatus 13 so as to follow steep changes in the overall consumed power of the customer 1, short-term prediction and control are needed so as to capture short-term changes in the consumed power. In order to ensure the charged electric energy required to reduce steep changes in the received power from the power network 2, long-term prediction and control are required, for example, for one day. If the long-term prediction and control are performed at the same prediction cycle and the same control cycle as those of the short-term prediction and control, a large amount of data is required. However, according to the power management system of the first embodiment, it is possible to reduce an increase in the required amount of data by setting the sample time of the long-term prediction model to be longer than the sample time of the short-term prediction model, and selectively using the long-term prediction model or the short-term prediction model according to a purpose.

Next, modified embodiments of the power management system of the first embodiment will be described.

The short-term prediction model may be updated more frequently than the long-term prediction model. In this way, it is possible to more suitably follow changes in the environment of the customer 1, such as changes of residents, thus improving the learning accuracy of the short-term prediction model.

The controller 21 may communicate with the external server apparatus 3, and obtain data of electricity costs from the server apparatus 3. In this case, the controller 21 may dynamically set the threshold power ThA in step S3 of FIG. 7 in accordance with the electricity costs. Further, when an electricity cost exceeds the first threshold, the controller 21 may give priority to the power storage apparatus 13 over the power network 2, for supplying power to the load apparatus 15, and discharge a discharging power from the power storage apparatus 13 to the load apparatus 15. In addition, when the electricity cost is less than the second threshold, the controller 21 may charge a charging power from the power network 2 to the power storage apparatus 13. The second threshold may be equal to the first threshold, and may be higher or lower than the first threshold. Thus, it is possible to reduce the electricity cost.

When generating the long-term prediction model, the long-term prediction model generator 22 may also use the status of the power storage apparatus 13 obtained from the sensor 14. When generating the short-term prediction model, the short-term prediction model generator 24 may also use the status of the power storage apparatus 13 obtained from the sensor 14. The short-term predictor 25 may also use the status of the power storage apparatus 13 obtained from the sensor 14. When controlling charging and discharging of the power storage apparatus 13, the controller 21 may also use the status of the power storage apparatus 13 obtained from the sensor 14. By using the status of the power storage apparatus 13 obtained from the sensor 14, it is possible to more accurately recognize the charging power, the discharging power, and the charged electric energy of the power storage apparatus 13.

At least one of the load apparatus 15 and the power storage apparatus 13 may include an electric vehicle.

The customer 1 may include a plurality of power storage apparatuses. Thus, it is possible to reduce the charging capacity per power storage apparatus, and increase the maximum controllable current.

The short-term prediction model generator 24 may be provided with three or more learning machines.

For example, in the case where the power is transmitted and received among a plurality of customers as described in the fifth embodiment, the long-term prediction model can be generated so that one customer considers the consumed power of other customers, and so as to consider how much power is transmitted from which customer to which customer. In addition, in the case where the long-term prediction model is generated using the same method as that of the short-term prediction model, the types of customers, including houses, shops, factories, and the like, may be classified based on information of temporal changes in consumed power of various customers, and based on other information, in a manner similar to that of the short-term prediction model. The long-term prediction model generator 22 determines to which type the customer 1 belongs, based on the overall consumed power of the customer 1, and generates a long-term prediction model based on the determined result. As described above, even when generating a long-term prediction model, it is possible to improve learning efficiency and learning accuracy using data of other customers.

Second Embodiment

In the second embodiment, a power management system for a customer further provided with a power generator apparatus will be described.

Figure 15:
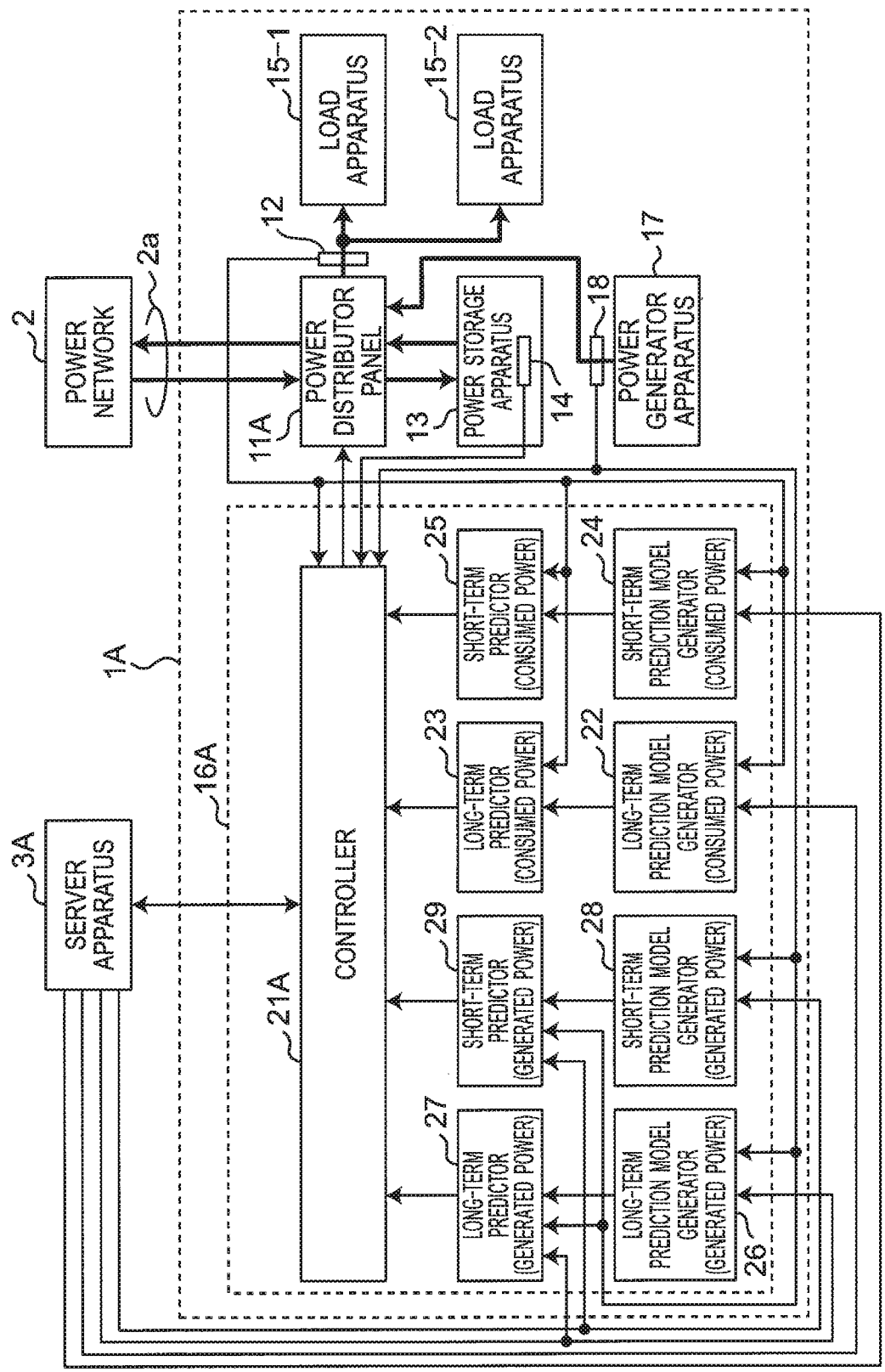
FIG. 15 is a block diagram illustrating a configuration of a power management system of a customer 1A according to a second embodiment.

FIG. 15 is a block diagram illustrating a configuration of a power management system of a customer 1A according to the second embodiment. The customer 1A in FIG. 15 is provided with a power distribution panel 11A and a control apparatus 16A, instead of the power distribution panel 11 and the control apparatus 16 of the customer 1 of FIG. 1, and further provided with a power generator apparatus 17 and a power meter 18. The customer 1A is connected to the power network 2 and a server apparatus 3A.

The power generator apparatus 17 generates generated power Pg. The power generator apparatus 17 is, for example, a set of solar cells, but may be other power supplies. The power generator apparatus 17 includes a DC-to-AC power converter circuit.

The power meter 18 measures the generated power of the power generator apparatus 17, and notifies the control apparatus 16A of the measured power.

The power distribution panel 11A transmits power among the power network 2, the power storage apparatus 13, the power generator apparatus 17, and the load apparatuses 15-1, 15-2, under control of the control apparatus 16A. In some cases, the power distribution panel 11A transmits the power received from the power network 2, to the power storage apparatus 13 and/or the load apparatuses 15-1, 15-2. In other cases, the power distribution panel 11A transmits the power received from the power storage apparatus 13, to the load apparatuses 15-1, 15-2 and/or the power network 2. In other cases, the power distribution panel 11A transmits the power received from the power generator apparatus 17, to the power storage apparatus 13, the load apparatuses 15-1, 15-2, and/or the power network 2.

The control apparatus 16A is provided with a controller 21A, instead of the controller 21 of the control apparatus 16 of FIG. 1, and further provided with a long-term prediction model generator 26, a long-term predictor 27, a short-term prediction model generator 28, and a short-term predictor 29, for predicting temporal changes in the generated power. The long-term prediction model generator 22, the long-term predictor 23, the short-term prediction model generator 24, and the short-term predictor 25 of the control apparatus 16A are provided for predicting temporal changes in the overall consumed power of the customer 1, in a manner similar to the corresponding components of the control apparatus 16 of FIG. 1.

The controller 21A executes a power management process described later with reference to FIGS. 16 and 17, to control charging and discharging of the power storage apparatus 13.

The long-term prediction model generator 26 for the generated power generates a long-term prediction model for the generated power, indicating temporal changes in the generated power of the power generator apparatus 17 over a certain time interval. The long-term predictor 27 for the generated power predicts long-term predicted power of the generated power using the long-term prediction model for the generated power, the long-term predicted power indicating temporal changes in the generated power over the long-term prediction period. In the case where the power generator apparatus 17 is a set of solar cells, the long-term prediction model generator 26 may obtain weather data from the server apparatus 3A, and generate, based on the weather data, the long-term prediction model indicating temporal changes in the generated power of the solar cells over a certain time interval. Similarly, when the power generator apparatus 17 is a set of solar cells, the long-term predictor 27 may obtain weather data from the server apparatus 3A, and predict the long-term predicted power of the generated power based on the weather data, the long-term predicted power indicating temporal changes in the generated power of the solar cells over the long-term prediction period.

In the present specification, the long-term prediction model for the generated power is also referred to as a "third prediction model", the long-term predicted power of the generated power is also referred to as a "third predicted power", the long-term prediction model generator 26 is also referred to as a "third prediction model generator", and the long-term predictor 27 is also referred to as a "third predictor".

The short-term prediction model generator 28 for the generated power generates a short-term prediction model for the generated power, indicating temporal changes in the generated power of the power generator apparatus 17 over the short-term prediction period immediately after the current time. The short-term predictor 29 for the generated power predicts short-term predicted power of the generated power using the short-term prediction model for the generated power, the short-term predicted power indicating temporal changes in the generated power over the short-term prediction period immediately after the current time. When the power generator apparatus 17 is a set of solar cells, the short-term prediction model generator 28 may obtain weather data from the server apparatus 3A, and generate, based on the weather data, the short-term prediction model indicating temporal changes in the generated power of the solar cells over the short-term prediction period immediately after the current time. Similarly, when the power generator apparatus 17 is a set of solar cells, the short-term predictor 29 may obtain weather data from the server apparatus 3A, and predict the short-term predicted power of the generated power based on the weather data, the short-term predicted power indicating temporal changes in the generated power of the solar cells over the short-term prediction period immediately after the current time.

In the present specification, the short-term prediction model for the generated power is also referred to as a "fourth prediction model", the short-term predicted power of the generated power is also referred to as a "fourth predicted power", the short-term prediction model generator 28 is also referred to as a "fourth prediction model generator", and the short-term predictor 29 is also referred to as a "fourth predictor".

When the power generator apparatus 17 is a set of solar cells, the weather data inputted into the short-term prediction model generator 28 and the short-term predictor 29 have finer time granularity than the weather data inputted into the long-term prediction model generator 26 and the long-term predictor 27. For example, the long-term prediction model generator 26 and the long-term predictor 27 may receive data input, such as weather forecast for one day, one week, or one month later. On the other hand, the short-term prediction model generator 28 and the short-term predictor 29 may receive data input, such as weather forecast for several minutes or several hours later, an image captured by a meteorological satellite or the like (e.g., an image showing the movement of clouds).

If the short-term prediction and the long-term prediction for the generated power are performed in the same prediction cycle, a large amount of data is required. However, it is possible to reduce an increase in the required amount of data by setting the sample time of the long-term prediction model for the generated power to be longer than the sample time of the short-term prediction model for the generated power, and selectively using the long-term prediction model or the short-term prediction model according to a purpose.

When the power generator apparatus 17 is a set of solar cells, the generated power may change steeply due to a change in weather or the like. In addition, the generated power may change steeply due to the failure of the power generator apparatus 17. In the case where the generated power changing steeply flows into the power network 2, the quality of the power transmitted through the power network 2 may degrade. Therefore, it is required to control charging and discharging of the power storage apparatus 13 so as to absorb steep changes in the generated power of the power generator apparatus 17.

Figure 16:
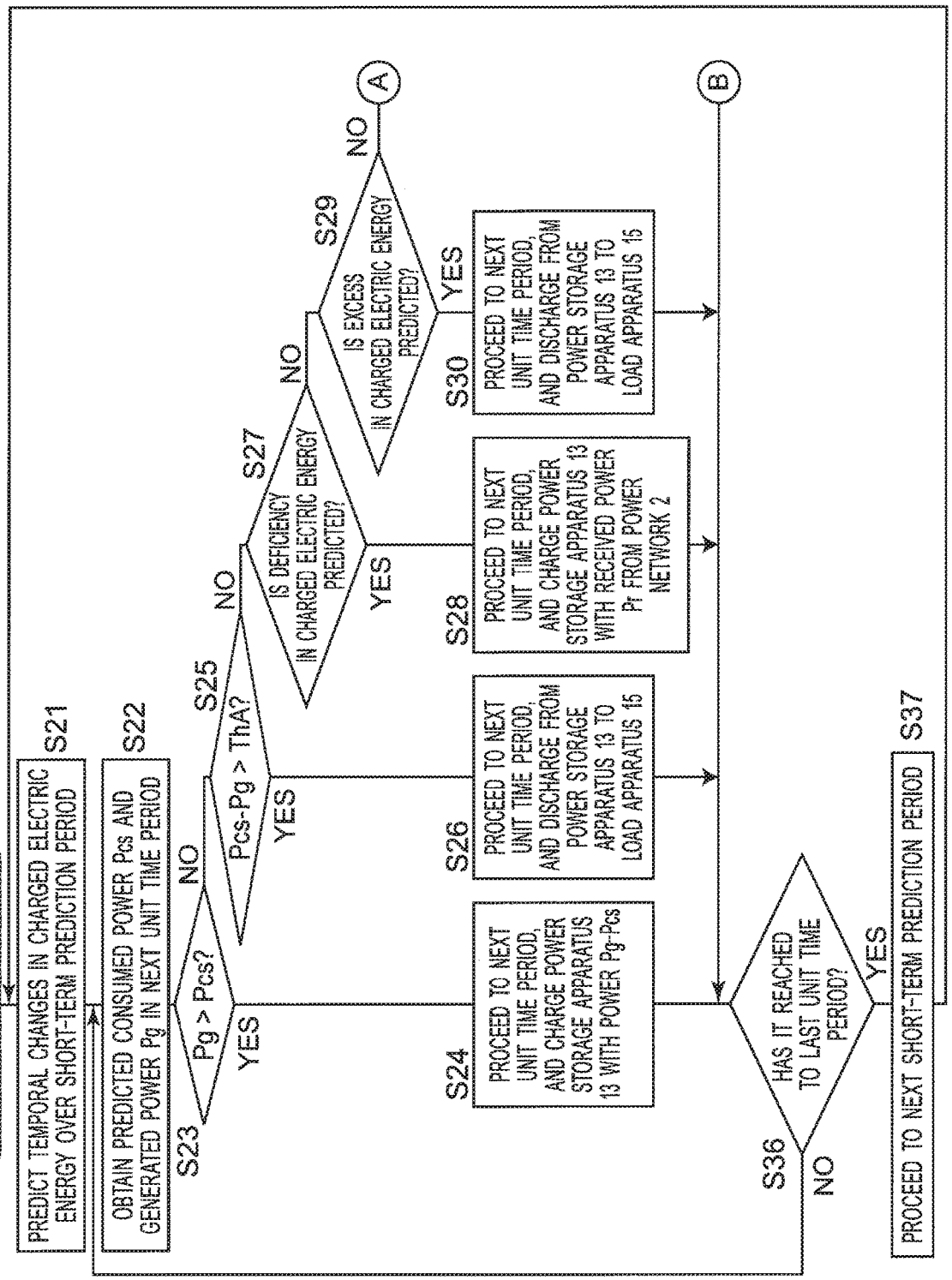
FIG. 16 is a flowchart illustrating a first part of a power management process executed by a controller 21A of FIG. 15.
Figure 17:
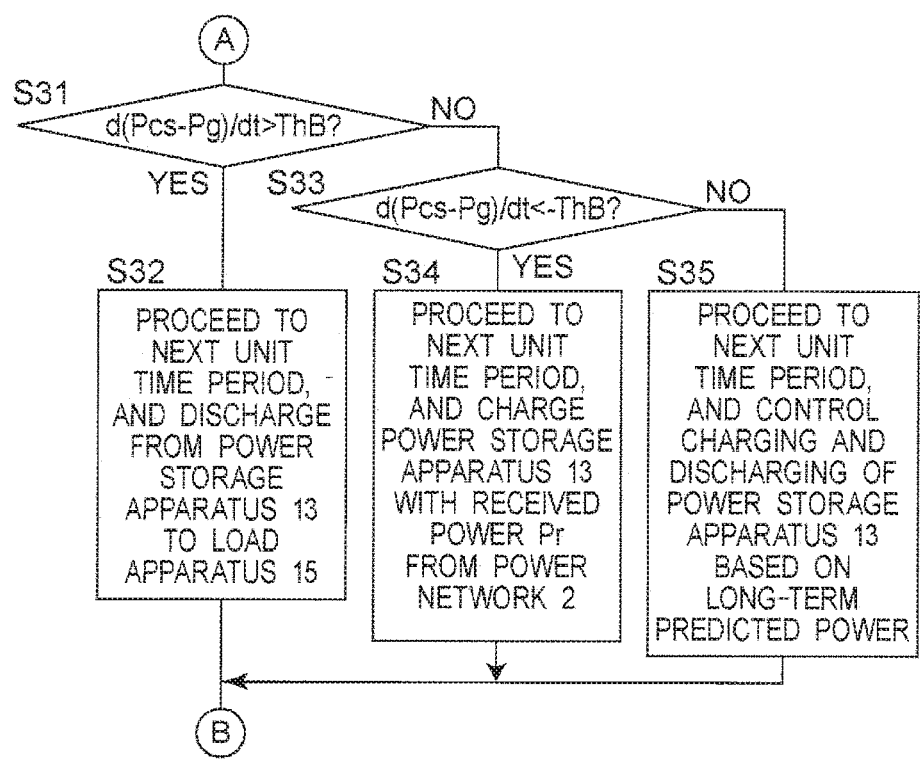
FIG. 17 is a flowchart illustrating a second part of the power management process executed by the controller 21A of FIG. 15.

FIGS. 16 and 17 are flowcharts illustrating the power management process executed by the controller 21A of FIG. 15.

In step S21 of FIG. 16, the controller 21A obtains the long-term predicted power and the short-term predicted power of the consumed power in the short-term prediction period immediately after the current time (or the short-term prediction period including the current time), from the long-term predictor 23 and the short-term predictor 25, respectively. Further, the controller 21A obtains the long-term predicted power and the short-term predicted power of the generated power in the short-term prediction period immediately after the current time (or the short-term prediction period including the current time), from the long-term predictor 27 and the short-term predictor 29, respectively. Further, the controller 21A predicts temporal changes in the charging power, the discharging power, and the charged electric energy of the power storage apparatus 13 over the short-term prediction period, based on the long-term predicted power and the short-term predicted power of the consumed power, and based on the long-term predicted power and the short-term predicted power of the generated power. In step S22, the controller 21A obtains predicted overall consumed power Pcs of the customer 1 and predicted generated power Pg in the next unit time period, from the short-term predicted power of the consumed power and the short-term predicted power of the generated power obtained in step S21.

In step S23, the controller 21A determines whether or not the generated power Pg in the next unit time period exceeds the consumed power Pcs; if YES, the process proceeds to step S24, and if NO, the process proceeds to step S25. In step S24, the controller 21A proceeds to the next unit time period, and while the generated power Pg exceeds the consumed power Pcs, the controller 21A supplies the power equal to the consumed power Pcs, from the power generator apparatus 17 to the load apparatus 15, and charges a remaining power Pg-Pcs, from the power generator apparatus 17 to the power storage apparatus 13.

In step S25, the controller 21A determines whether or not power difference Pcs-Pg between the consumed power Pcs and the generated power Pg in the next unit time period exceeds the threshold power ThA; if YES, the process proceeds to step S26, and if NO, the process proceeds to step S27. In step S26, the controller 21A proceeds to the next unit time period, and then, supplies the received power Pr equal to the threshold power ThA, from the power network 2 to the load apparatus 15, and discharges deficient power for the power difference Pcs-Pg, from the power storage apparatus 13 to the load apparatus 15.

Figure 18:
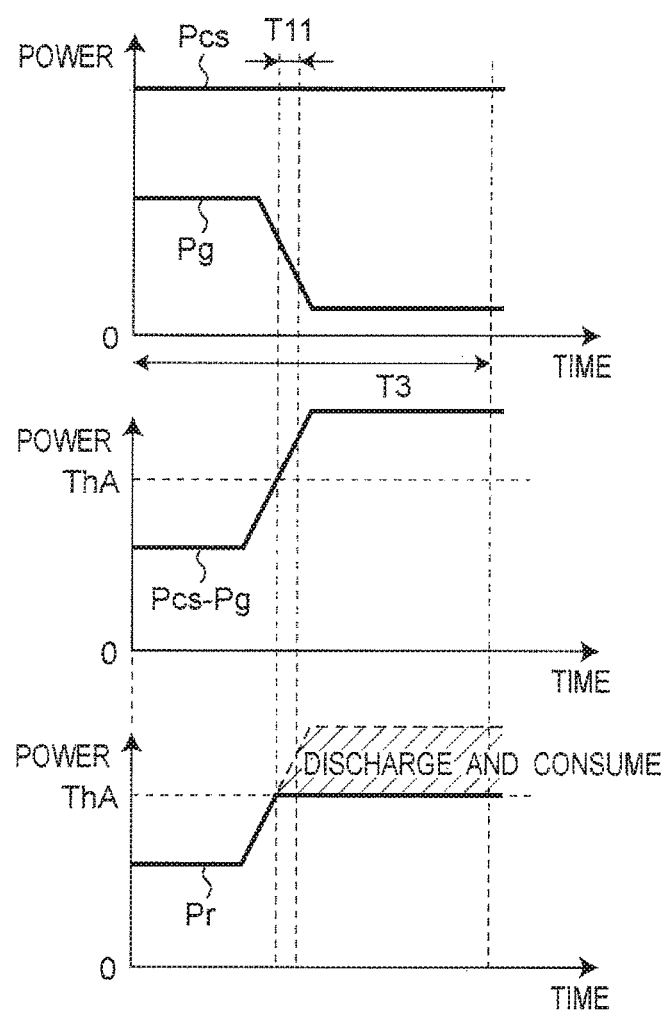
FIG. 18 is a graph illustrating an operation to be done in the customer 1A of FIG. 15, when power difference Pcs-Pg between consumed power Pcs and generated power Pg exceeds the threshold power ThA of the received power Pr.

FIG. 18 is a graph illustrating an operation to be done in the customer 1A of FIG. 15, when the power difference Pcs-Pg between the consumed power Pcs and the generated power Pg exceeds the threshold power ThA of the received power Pr. When the consumed power Pcs increases, or when the generated power Pg decreases as shown in the top of FIG. 18, the power difference Pcs-Pg may exceed the threshold power ThA in a certain unit time period T11, as shown in the middle of FIG. 18. In case of receiving the power from the power network 2 in excess of the threshold power ThA in accordance with the increase in the power difference Pcs-Pg, the unit price of the electricity costs increases as described above. Therefore, as shown in the bottom of FIG. 18, when the power difference Pcs-Pg is predicted to exceed the threshold power ThA, the controller 21A discharges power from the power storage apparatus 13 to the load apparatus 15, while the power difference Pcs-Pg exceeds the threshold power ThA. Thus, it is possible to keep the amount of the received power Pr equal to or smaller than the threshold power ThA.

In step S27, the controller 21A determines whether or not a deficiency in the charged electric energy of the power storage apparatus 13 is predicted in the short-term prediction period; if YES, the process proceeds to step S28, and if NO, the process proceeds to step S29. In step S28, the controller 21A proceeds to the next unit time period, and charges power from the power network 2 to the power storage apparatus 13, while supplying the power equal to the power difference Pcs-Pg, from the power network 2 to the load apparatus 15.

In steps S27 and S28, when the charged electric energy is predicted to reach the lower limit Th1 due to discharging of the power storage apparatus 13, the controller 21A charges power from the power network 2 to the power storage apparatus 13 in advance, in the current unit time period T11, in a manner similar to steps S5 and S6 of FIG. 7. Thus, as described with reference to FIG. 9, the charged electric energy is less likely to reach the lower limit Th1 even when discharging the power storage apparatus 13.

In step S29, the controller 21A determines whether or not an excess in the charged electric energy of the power storage apparatus 13 is predicted in the short-term prediction period; if YES, the process proceeds to step S30 of FIG. 17, and if NO, the process proceeds to step S31. In step S30, the controller 21A proceeds to the next unit time period, and discharges power equal to at least a part of the power difference Pcs-Pg, from the power storage apparatus 13 to the load apparatus 15.

Figure 19:
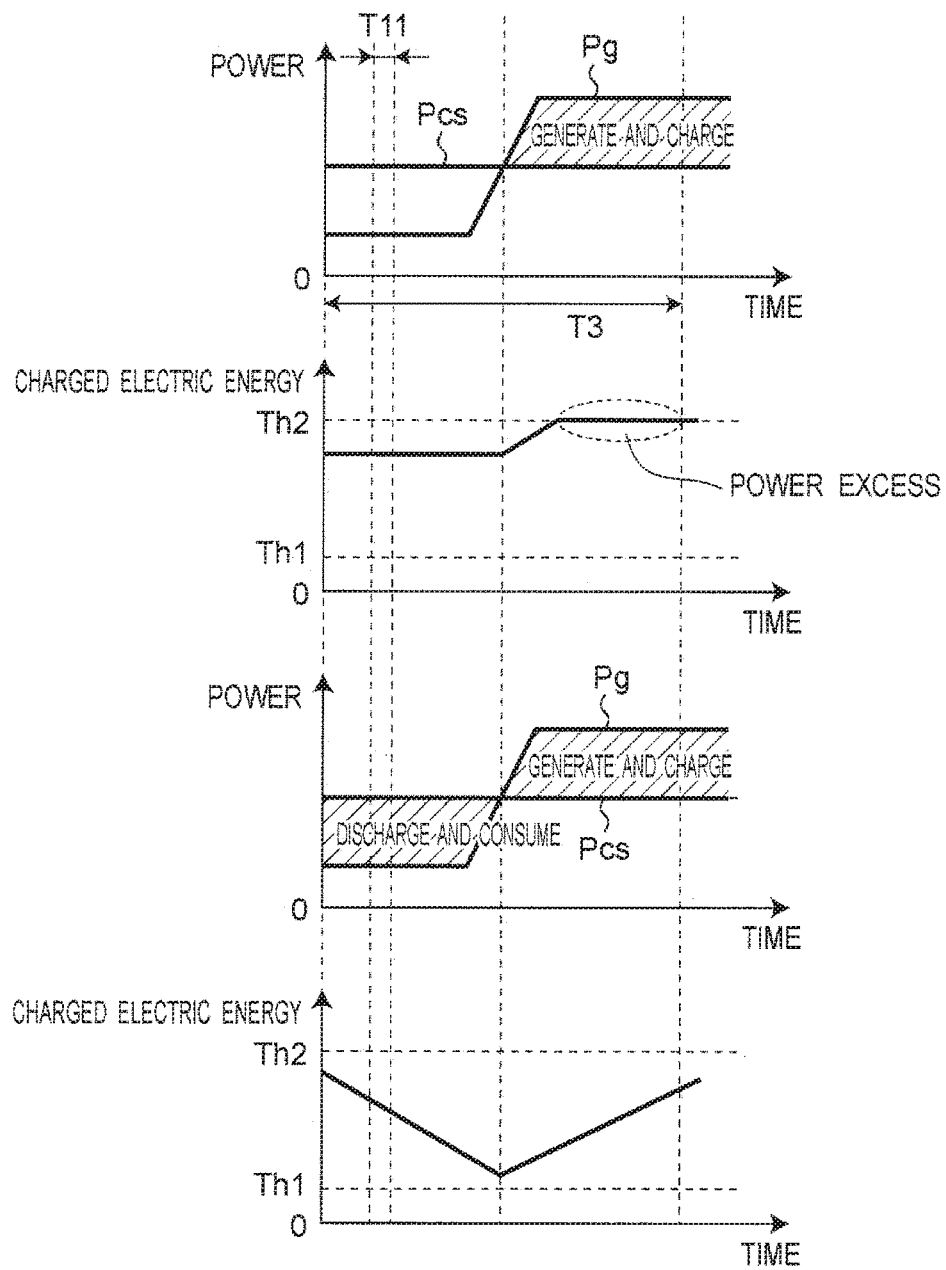
FIG. 19 is a graph illustrating an operation to be done in the customer 1A of FIG. 15, when charged electric energy of a power storage apparatus 13 reaches an upper limit Th2 due to charging.

FIG. 19 is a graph illustrating an operation to be done in the customer 1A of FIG. 15, when the charged electric energy of the power storage apparatus 13 reaches an upper limit Th2 due to charging. When the power storage apparatus 13 is charged with power from the power generator apparatus 17 as shown in the first graph of FIG. 19, the charged electric energy of the power storage apparatus 13 may reach the upper limit Th2 as shown in the second graph of FIG. 19. In this case, the power storage apparatus 13 can not be further charged, and the generated power is wasted. Accordingly, as shown in the third graph of FIG. 19, when the charged electric energy is predicted to reach the upper limit Th2 due to charging of the power storage apparatus 13, the controller 21A discharges power from the power storage apparatus 13 to the load apparatus 15 in advance, in the current unit time period T11. Thus, as shown in the fourth graph of FIG. 19, the charged electric energy is less likely to reach the upper limit Th2 even when charging the power storage apparatus 13.

In step S31 of FIG. 17, the controller 21A calculates a change rate of the power difference Pcs-Pg, i.e., d(Pcs-Pg)/dt. Further, the controller 21A determines whether or not the change rate d(Pcs-Pg)/dt is higher than a positive threshold rate ThB; if YES, the process proceeds to step S32, and if NO, the process proceeds to step S33. In step S32, the controller 21A proceeds to the next unit time period, and discharges deficient power for the power difference Pcs-Pg, from the power storage apparatus 13 to the load apparatus 15, while maintaining the amount of the received power Pr from the power network 2.

In steps S31 and S32, when the power difference Pcs-Pg is predicted to increase steeply, the controller 21A begins to discharge power from the power storage apparatus 13 to the load apparatus 15 at the moment of the steep increase in the power difference Pcs-Pg, in a manner similar to steps S7 and S8 of FIG. 7. Thus, the received power Pr is less likely to increase steeply, as described with reference to FIG. 10 (however, the consumed power Pcs in the top of FIG. 10 should read the power difference Pcs-Pg).

In step S33, the controller 21A determines whether or not the change rate d(Pcs-Pg)/dt is lower than a negative threshold rate –ThB; if YES, the process proceeds to step S34, and if NO, the process proceeds to step S35. In step S34, the controller 21A proceeds to the next unit time period, and charges excess power of the received power Pr over the power difference Pcs-Pg, to the power storage apparatus 13, while maintaining the amount of the received power Pr from the power network 2.

In steps S33 and S34, when the power difference Pcs-Pg is predicted to decrease steeply, the controller 21A begins to charge power from the power network 2 to the power storage apparatus 13 at the moment of the steep decrease in the power difference Pcs-Pg, in a manner similar to steps S9 and S10 of FIG. 7. Thus, the received power Pr is less likely to decrease steeply, as described with reference to FIG. 11 (however, the consumed power Pcs in the top of FIG. 11 should read the power difference Pcs-Pg).

In step S35 of FIG. 16, the controller 21A proceeds to the next unit time period, and controls charging and discharging of the power storage apparatus 13 based on the long-term predicted power.

In step S36, the controller 21A determines whether or not to have reached the last unit time period; if YES, the process proceeds to step S37, and if NO, the process returns to step S22. In step S37, the controller 21A proceeds to the next short-term prediction period, and the process returns to step S21.

According to the power management system of the second embodiment, it is possible to absorb steep changes in the generated power of the power generator apparatus 17, by rapidly controlling charging and discharging of the power storage apparatus 13 every unit time period based on the short-term predicted power. By absorbing steep changes in the generated power of the power generator apparatus 17, the quality of the power transmitted through the power network 2 is less likely to degrade. By predicting the generated power of the power generator apparatus 17, it is possible to control charging and discharging of the power storage apparatus 13 with high accuracy.

According to the power management system of the second embodiment, it is possible to increase an available amount of renewable energy, while maintaining the stability of the power network 2. It is possible to effectively use the power generated by the power generator apparatus 17 and charged to the power storage apparatus 13, and therefore, more effectively achieve local production and local consumption of power at the customer 1.

Third Embodiment

Figure 20:
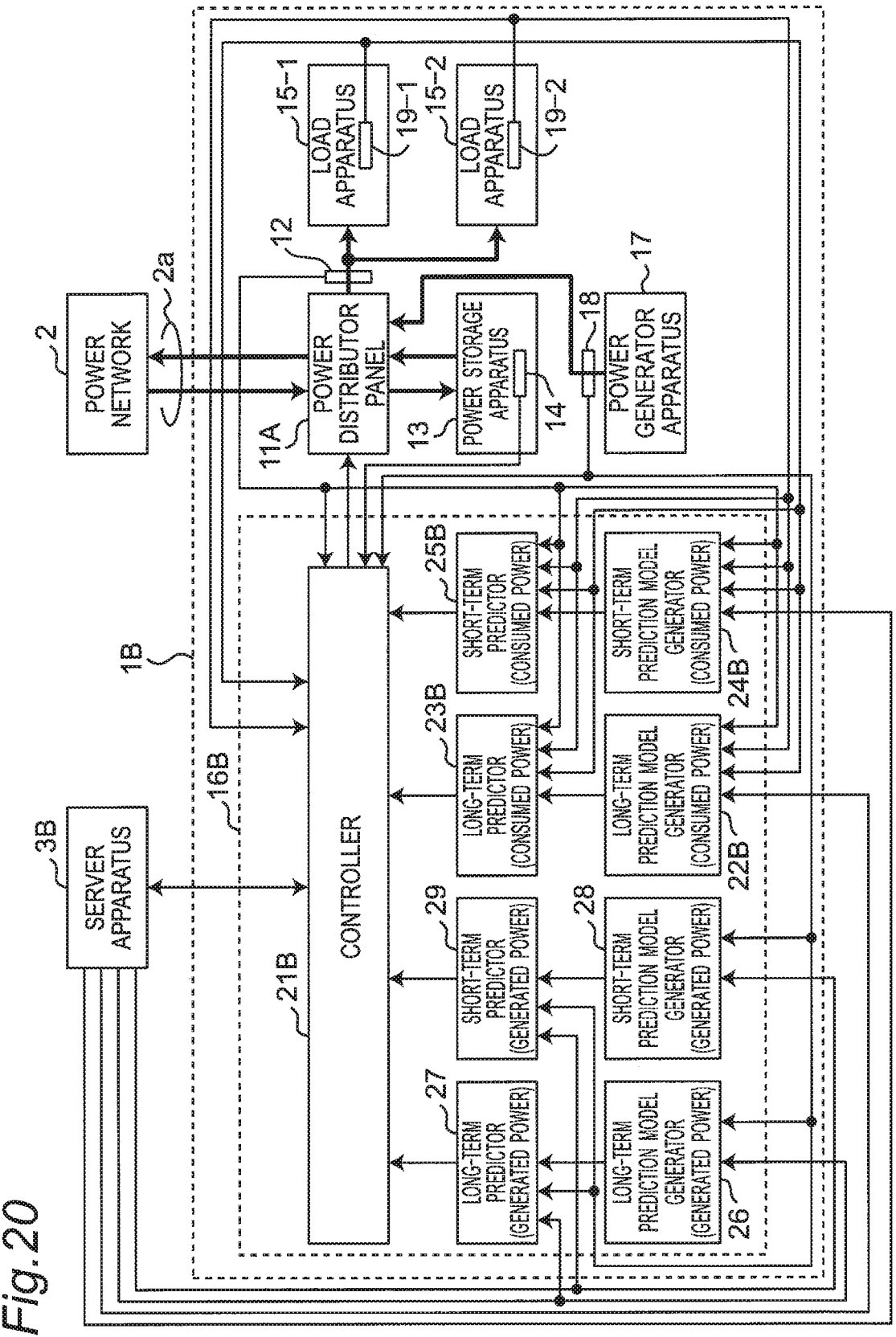
FIG. 20 is a block diagram illustrating a configuration of a power management system of a customer 1B according to a third embodiment.

FIG. 20 is a block diagram illustrating a configuration of a power management system of a customer 1B according to a third embodiment. The customer 1B in FIG. 20 is provided with a control apparatus 16B instead of the control apparatus 16A of the customer 1A of FIG. 15, and further provided with power meters 19-1, 19-2. The customer 1B is connected to the power network 2 and a server apparatus 3B.

The power meters 19-1, 19-2 measure the consumed power of the load apparatuses 15-1, 15-2, respectively, and notify the control apparatus 16B of the measured power.

The control apparatus 16B of FIG. 20 is provided with a long-term prediction model generator 22B, a long-term predictor 23B, a short-term prediction model generator 24B, and a short-term predictor 25B, instead of the long-term prediction model generator 22, the long-term predictor 23, the short-term prediction model generator 24, and the short-term predictor 25 of the control apparatus 16A of FIG. 15. When generating the long-term prediction model, the long-term prediction model generator 22B uses temporal changes in the consumed power of the load apparatuses 15-1, 15-2 measured by the power meters 19-1, 19-2, respectively, in addition to using the temporal changes in the overall consumed power of the customer 1 measured by the power meter 12. The long-term predictor 23B uses temporal changes in the consumed power of the load apparatuses 15-1, 15-2 measured by of the power meters 19-1, 19-2, respectively, in addition to using the temporal changes in the overall consumed power of the customer 1 measured by the power meter 12. When generating the short-term prediction model, the short-term prediction model generator 24B uses temporal changes in the consumed power of the load apparatuses 15-1, 15-2 measured by the power meters 19-1, 19-2, respectively, in addition to using the temporal changes in the overall consumed power of the customer 1 measured by the power meter 12. The short-term predictor 25B uses temporal changes in the consumed power of the load apparatuses 15-1, 15-2 measured by the power meters 19-1, 19-2, respectively, in addition to using the temporal changes in the overall consumed power of the customer 1 measured by the power meter 12.

According to the power management system of the third embodiment, it is possible to improve the accuracy of predicting temporal changes in the overall consumed power of the customer 1, by using the temporal changes in the consumed power of the load apparatuses 15-1, 15-2 measured by the power meters 19-1, 19-2, respectively.

Fourth Embodiment

Figure 21:
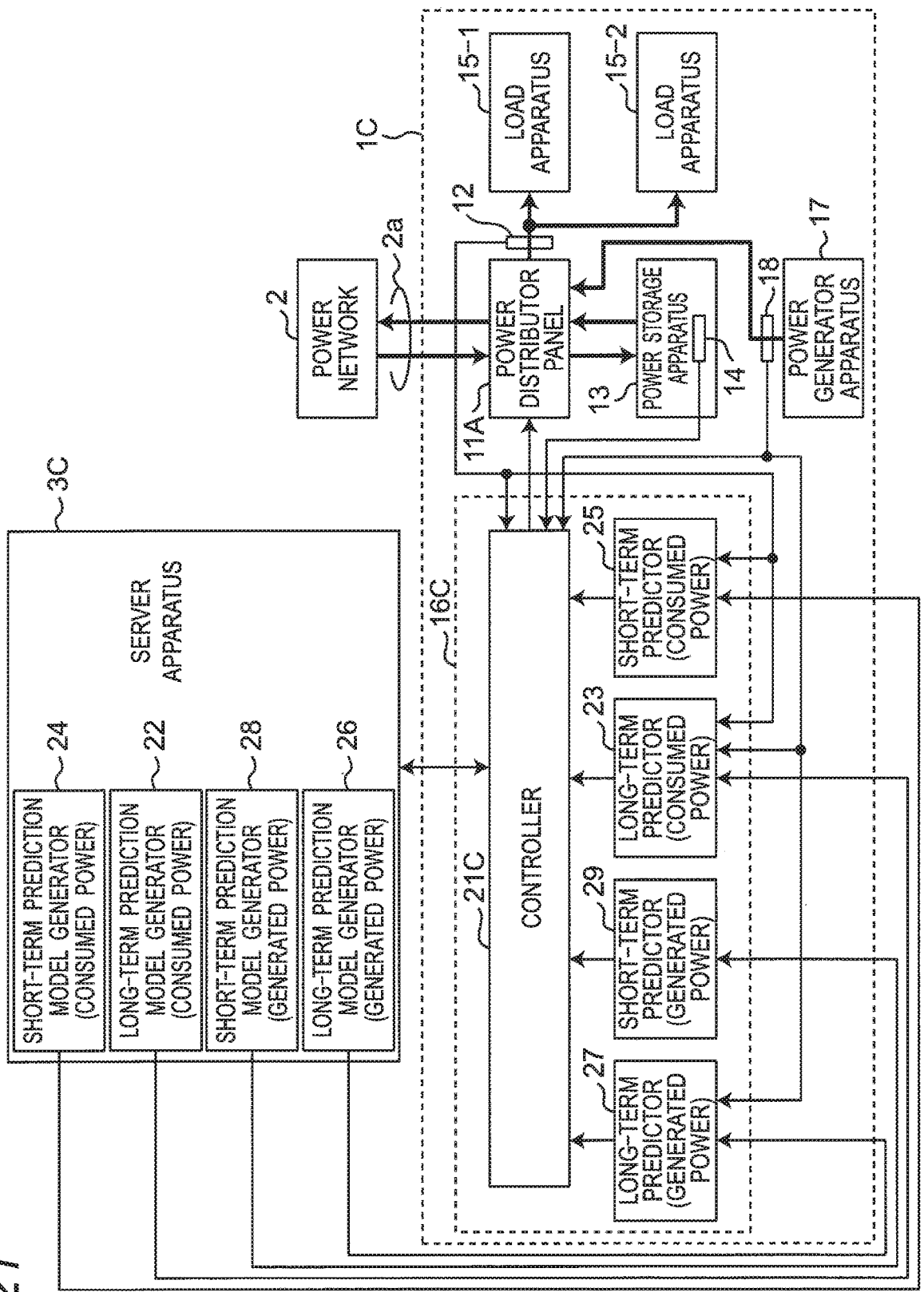
FIG. 21 is a block diagram illustrating a configuration of a power management system of a customer 1C according to a fourth embodiment.

FIG. 21 is a block diagram illustrating a configuration of a power management system of a customer 1C according to a fourth embodiment. The customer 1C in FIG. 21 includes a control apparatus 16C instead of the control apparatus 16A of the customer 1A of FIG. 15. The customer 1C is connected to the power network 2 and a server apparatus 3C.

The control apparatus 16C of FIG. 21 is not provided with the long-term prediction model generator 22, the short-term prediction model generator 24, the long-term prediction model generator 26, and the short-term prediction model generator 28 of the control apparatus 16A of FIG. 15. The long-term prediction model generator 22, the short-term prediction model generator 24, the long-term prediction model generator 26, and the short-term prediction model generator 28 are provided in the external server apparatus 3C. The control apparatus 16C notifies the external server apparatus 3C of the overall consumed power of the customer 1 measured by the power meter 12, the status of the power storage apparatus 13 measured by the sensor 14, and the generated power of the power generator apparatus 17 measured by the power meter 18. The control apparatus 16C obtains the long-term prediction model and the short-term prediction model for the consumed power, and the long-term prediction model and the short-term prediction model for the generated power, from the server apparatus 3C.

According to the power management system of the fourth embodiment, the server apparatus 3C generates the long-term prediction model and the short-term prediction model for the consumed power, and the long-term prediction model and the short-term prediction model for the generated power, and therefore, it is possible to simplify configuration and process of the control apparatus 16C. By increasing the size of the server apparatus 3C, it is possible to readily deal with an increase in the amount of data for generating the long-term prediction model and the short-term prediction model for the consumed power, and the long-term prediction model and the short-term prediction model for the generated power.

On the other hand, in the case where the control apparatus 16A of the customer 1A generates the long-term prediction model and the short-term prediction model for the consumed power, and the long-term prediction model and the short-term prediction model for the generated power, as in the power management system of the second embodiment and the like, the control apparatus 16A can operate autonomously and continuously even when the server apparatus 3A is down. In addition, the communication fee with the server apparatus 3A can be reduced. When the short-term prediction model generator 24 and the short-term predictor 25 are provided in the customer 1A, it is possible to quickly deal with a change in the short-term prediction model for the consumed power.

Fifth Embodiment

Figure 22:
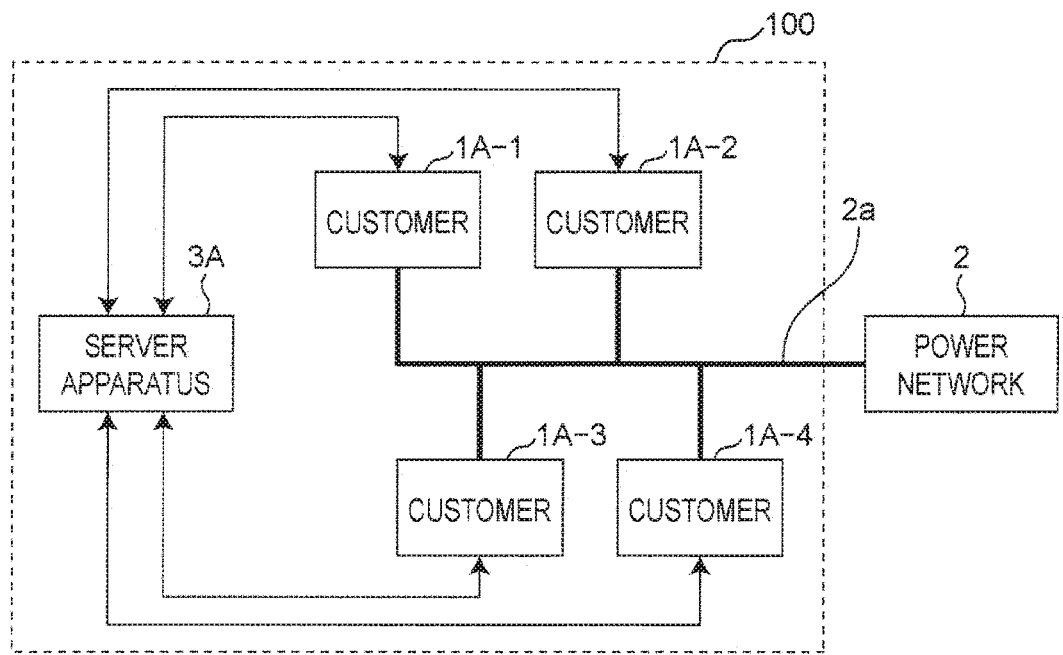
FIG. 22 is a block diagram illustrating a configuration of a power grid 100 according to a fifth embodiment.

FIG. 22 is a block diagram illustrating a configuration of a power grid 100 according to a fifth embodiment. The power grid 100 of FIG. 22 is provided with: a plurality of customers 1A-1 to 1A-4 connected to the power network 2 through the power line 2a; and a server apparatus 3A. Each of the plurality of customers 1A-1 to 1A-4 is configured in a manner similar to that of the customer 1A of the second embodiment (or the customers 1B to 1C of the second to third embodiments). Hereinafter, the customers 1A-1 to 1A-4 are also collectively referred to as a customer 1A. The server apparatus 3A controls the control apparatus 16A of each customer LA so as to controls transmitting and receiving of power among the customers 1A.

The server apparatus 3A generates a long-term prediction model for consumed power of the power grid 100, indicating temporal changes in overall consumed power of the power grid 100 (i.e., total consumed power of the customers 1A) over a certain time interval, based on the long-term prediction model for the consumed power of each customer 1A. The server apparatus 3A predicts a long-term predicted power of consumed power of the power grid 100 using the long-term prediction model for the consumed power of the power grid 100, the long-term predicted power indicating temporal changes in the overall consumed power of the power grid 100.

The server apparatus 3A generates a short-term prediction model for the consumed power of the power grid 100, indicating temporal changes in the overall consumed power of the power grid 100 over a sixth time period in which the consumed power of each customer LA changes, based on the long-term prediction model and the short-term prediction model for the consumed power of each customer 1A. The server apparatus 3A predicts short-term predicted power of the consumed power of the power grid 100 using the short-term prediction model for the consumed power of the power grid 100, the short-term predicted power being predicted based on temporal changes in the overall consumed power of the power grid 100 over a seventh time period immediately before the current time, the short-term predicted power indicating temporal changes in the overall consumed power of the power grid 100 over an eighth time period immediately after the current time.

The server apparatus 3A controls transmitting and receiving of power among the customers 1A, so as to set transmitting power and receiving power every ninth time period, based on the long-term predicted power of the consumed power of the power grid 100. The server apparatus 3A controls transmitting and receiving of power among respective customers 1A, so as to set transmitting power and receiving power every tenth time period shorter than the eighth and ninth time periods, based on the short-term predicted power of the consumed power of the power grid 100.

The server apparatus 3A operates as follows when the power generator apparatus 17 of each customer 1A is not considered (or when the power grid 100 includes the customers 1 of FIG. 1 without the power generator apparatus).

The server apparatus 3A predicts temporal changes in the overall charging power, discharging power, and charged electric energy of the power grid 100 (i.e., total values for the power storage apparatuses 13 of the customers 1A), based on the long-term predicted power and the short-term predicted power of the consumed power of the power grid 100. When the charged electric energy is predicted to reach a lower limit due to discharging of the power storage apparatus 13 of each customer 1A, the server apparatus 3A charges power from the power network 2 to the power storage apparatus 13 of each customer 1A in advance.

When the overall consumed power of the power grid 100 is predicted to steeply increase, based on the short-term predicted power of the consumed power of the power grid 100, the server apparatus 3A discharges power from the power storage apparatus 13 of one customer 1A to the load apparatuses 15 of other customers 1A at the moment of the steep increase in the overall consumed power of the power grid 100. When that the overall consumed power of the power grid 100 is predicted to steeply decrease, based on the short-term predicted power of the consumed power of the power grid 100, the server apparatus 3A charges power from the power network 2 to the power storage apparatus 13 of each customer 1A at the moment of the steep decrease in the overall consumed power of the power grid 100.

When the overall consumed power of the power grid 100 is predicted to exceed a threshold power, based on the short-term predicted power of the consumed power of the power grid 100, the server apparatus 3A discharges power from the power storage apparatus 13 of one customer 1A to the load apparatuses 15 of other customers 1A, while the overall consumed power of the power grid 100 exceeds the threshold power.

The server apparatus 3A operates as follows when the power generator apparatus 17 of each customer 1A is considered.

The server apparatus 3A predicts long-term predicted power of generated power of the power grid 100, the long-term predicted power indicating temporal changes in overall generated power of the power grid 100 (i.e., total generated power of the power generator apparatuses 17 of the customers 1A) over a certain time interval. In addition, the server apparatus 3A predicts short-term predicted power of the generated power of the power grid 100, the short-term predicted power indicating temporal changes in the overall generated power of the power grid 100 over the short-term prediction period immediately after the current time. The server apparatus 3A predicts temporal changes in the overall charging power, discharging power, and charged electric energy of the power grid 100, based on the long-term predicted power and the short-term predicted power of the consumed power of the power grid 100, and based on the long-term predicted power and the short-term predicted power of the generated power of the power grid 100.

When the overall charged electric energy of the power grid 100 is predicted to reach an upper limit due to charging of the power storage apparatus 13 of each customer 1A, the server apparatus 3A discharges power from the power storage apparatus 13 of one customer 1A to the load apparatuses 15 of other customers 1A in advance.

When a power difference, obtained by subtracting the overall generated power of the power grid 100 from the overall consumed power of the power grid 100, is predicted to steeply increase, based on the short-term predicted power of the consumed power and the short-term predicted power of the generated power of the power grid 100, the server apparatus 3A discharges power from the power storage apparatus 13 of one customer 1A to the load apparatuses 15 of other customers 1A at the moment of the steep increase in the power difference. When the power difference is predicted to decrease steeply, based on the short-term predicted power of the consumed power and the short-term predicted power of the generated power of the power grid 100, the server apparatus 3A charges power from the power network 2 to the power storage apparatus 13 of each customer 1A at the moment of the steep decrease in the power difference.

When the power difference, obtained by subtracting the overall generated power of the power grid 100 from the overall consumed power of the power grid 100 is predicted to exceed a threshold power, based on the short-term predicted power of the consumed power and the short-term predicted power of the generated power of the power grid 100, the server apparatus 3A discharges power from the power storage apparatus 13 of one customer LA to the load apparatuses 15 of other customers 1A, while the power difference exceeds the threshold power.

When that the overall generated power of the power grid 100 is predicted to exceed the overall consumed power of the power grid 100, based on the short-term predicted power of the consumed power and the short-term predicted power of the generated power of the power grid 100, the server apparatus 3A charges power from the power generator apparatus 17 of one customer 1A to the power storage apparatuses 13 of other customers 1A, while the overall generated power of the power grid 100 exceeds the overall consumed power of the power grid 100.

According to the power grid management system of the fifth embodiment, it is possible to predict temporal changes in the consumed power over the entire power grid, and stably control the entire power grid.

Sixth Embodiment

Figure 23:
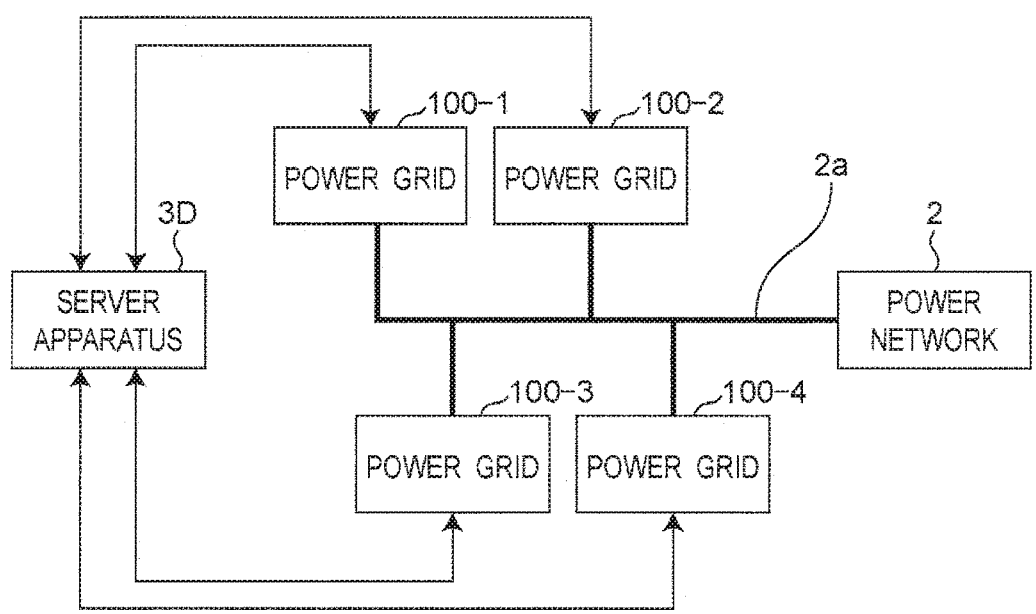
FIG. 23 is a block diagram illustrating a configuration of a power network system according to a sixth embodiment.

FIG. 23 is a block diagram illustrating a configuration of a power network system according to a sixth embodiment. The power network system of FIG. 23 is provided with: a plurality of power grids 100-1 to 100-4 connected to the power network 2 through the power line 2a; and a server apparatus 3D. Each of the plurality of power grids 100-1 to 100-4 is configured in a manner similar to that of the power grid 100 of the fifth embodiment. Hereinafter, the power grids 100-1 to 100-4 will be also collectively referred to as a power grid 100. The server apparatus 3D controls the server apparatus 3A of each power grid 100 so as to control transmitting and receiving of power among the power grids 100 to 100-4.

The server apparatus 3D generates a long-term prediction model for consumed power of the power network system, indicating temporal changes in overall consumed power of the power network system over a certain time interval, based on the long-term prediction model for the consumed power of each power grid 100. The server apparatus 3D predicts long-term predicted power of the consumed power of the power network system using the long-term prediction model for the consumed power of the power network system, the long-term predicted power indicating temporal changes in the overall consumed power of the power network system.

The server apparatus 3D generates a short-term prediction model for the consumed power of the power network system, indicating temporal changes in the overall consumed power of the power network system over an eleventh time period in which the consumed power of each power grid 100 changes, based on the long-term prediction model and the short-term prediction model for the consumed power of each power grid 100. The server apparatus 3D predicts short-term predicted power of the consumed power of the power network system using the short-term prediction model for the consumed power of the power network system, the short-term predicted power being predicted based on temporal changes in the overall consumed power of the power network system over a twelfth time period immediately before the current time, the short-term predicted power indicating temporal changes in the overall consumed power of the power network system over a thirteenth time period immediately after the current time.

The server apparatus 3D controls transmitting and receiving of power among the power grids 100, so as to set transmitting power and receiving power every fourteenth time period, based on the long-term predicted power of the consumed power of the power network system. The server apparatus 3D controls the transmitting and receiving of power among power grids 100, so as to set transmitting power and receiving power every fifteenth time period shorter than the thirteenth and fourteenth time periods, based on the short-term predicted power of the consumed power of the power network system.

The server apparatus 3D operates as follows when the power generator apparatus 17 of each power grid 100 is not considered (or when the power network system includes the power grids without the power generator apparatus).

The server apparatus 3D predicts temporal changes in the overall charging power, discharging power, and charged electric energy of the power network system (i.e., total values for the power storage apparatuses 13 of the power grids 100), based on the long-term predicted power and the short-term predicted power of the consumed power of the power network system. When the charged electric energy is predicted to reach a lower limit due to discharging of the power storage apparatus 13 of each power grid 100, the server apparatus 3D charges power from the power network 2 to the power storage apparatus 13 of each power grid 100 in advance.

When the overall consumed power of the power network system is predicted to steeply increase, based on the short-term predicted power of the consumed power of the power network system, the server apparatus 3D discharges power from the power storage apparatus 13 of one power grid 100 to the load apparatuses 15 of other power grids 100 at the moment of the steep increase in the overall consumed power of the power network system. When the overall consumed power of the power network system is predicted to steeply decrease, based on the short-term predicted power of the consumed power of the power network system, the server apparatus 3D charges power from the power network 2 to the power storage apparatuses 13 of the power grids 100 at the moment of the steep decrease in the overall consumed power of the power network system.

When the overall consumed power of the power network system is predicted to exceed a threshold power, based on the short-term predicted power of the consumed power of the power network system, the server apparatus 3D discharges power from the power storage apparatus 13 of one power grid 100 to the load apparatuses 15 of other power grids 100, while the overall consumed power of the power network system exceeds the threshold power.

The server apparatus 3D operates as follows when the power generator apparatus 17 of each power grid 100 is considered.

The server apparatus 3D predicts long-term predicted power of generated power of the power network system, the long-term predicted power indicating temporal changes in overall generated power of the power network system (i.e., total generated power of the power generator apparatuses 17 of the power grids 100) over a certain time interval. In addition, the server apparatus 3D predicts short-term predicted power of the generated power of the power network system, the short-term predicted power indicating temporal changes in the overall generated power of the power network system over the short-term prediction period immediately after the current time. The server apparatus 3D predicts temporal changes in the overall charging power, discharging power, and charged electric energy of the power network system, based on the long-term predicted power and the short-term predicted power of the consumed power of the power network system, and based on the long-term predicted power and the short-term predicted power of the generated power of the power network system.

When the overall charged electric energy of the power network system is predicted to reach an upper limit due to charging of the power storage apparatus 13 of each power grid 100, the server apparatus 3D discharges power from the power storage apparatus 13 of one power grid 100 to the load apparatuses 15 of other power grids 100 in advance.

When a power difference, obtained by subtracting the overall generated power of the power network system from the overall consumed power of the power network system, is predicted to steeply increase, based on the short-term predicted power of the consumed power and the short-term predicted power of the generated power of the power network system, the server apparatus 3D discharges power from the power storage apparatus 13 of one power grid 100 to the load apparatuses 15 of other power grids 100 at the moment of the steep increase in the power difference. When the power difference is predicted to decrease steeply, based on the short-term predicted power of the consumed power and the short-term predicted power of the generated power of the power network system, the server apparatus 3D charges power from the power network 2 to the power storage apparatuses 13 of the power grids 100 at the moment of the steep decrease in the power difference.

When predicting that the power difference, obtained by subtracting the overall generated power of the power network system from the overall consumed power of the power network system will exceed a threshold power, based on the short-term predicted power of the consumed power and the short-term predicted power of the generated power of the power network system, the server apparatus 3D discharges power from the power storage apparatus 13 of one power grid 100 to the load apparatuses 15 of other power grids 100, while the power difference exceeds the threshold power.

When the overall generated power of the power network system is predicted to exceed the overall consumed power of the power network system, based on the short-term predicted power of the consumed power and the short-term predicted power of the generated power of the power network system, the server apparatus 3D charges power from the power generator apparatus 17 of one power grid 100 to the power storage apparatuses 13 of other power grids 100, while the overall generated power of the power network system exceeds the overall consumed power of the power network system.

According to the power network management system of the sixth embodiment, it is possible to predict temporal changes in the consumed power over the entire power network system, and stably control the entire power network system.

In addition, a higher-order power management system may be configured, including a plurality of power network systems configured in a manner similar to the that of power network system of the sixth embodiment.

The charging and discharging of the power storage apparatus in a lower-order power management system may be restricted by a higher-order power management system. In this case, for example, in a power grid, transmitting and receiving of power among customers are restricted so as to balance the overall supply and demand of the power grid, and lower-order customers control charging and discharging of the power storage apparatus in consideration of the restrictions.

A control apparatus for a power storage apparatus, a power management system, and a power grid management system according to the present disclosure are configured as follows.

According to a first aspect of a control apparatus for a power storage apparatus, a control apparatus for at least one power storage apparatus in a customer, the customer being connected to a power network and having a plurality of load apparatuses and the at least one power storage apparatus, is provided. The control apparatus is provided with a first predictor a second predictor and a controller. The first predictor predicts first predicted power using a first prediction model indicating temporal changes in overall consumed power of the customer over a time interval, the first predicted power indicating temporal changes in the overall consumed power of the customer. The second predictor predicts second predicted power using a second prediction model indicating temporal changes in the overall consumed power of the customer over a first time period before and after consumed power of each of the plurality of load apparatuses changes, the second predicted power being predicted based on temporal changes in the overall consumed power of the customer over a second time period immediately before a current time, the second predicted power indicating temporal changes in the overall consumed power of the customer over a third time period immediately after the current time. The controller controls charging and discharging of the power storage apparatus so as to set a charging power or a discharging power every fourth time period based on the first predicted power, and set a charging power or a discharging power every fifth time period based on the second predicted power, the fifth time period being shorter than the third and fourth time periods. The controller predicts temporal changes in charging power, discharging power, and charged electric energy of the power storage apparatus, based on the first predicted power and the second predicted power, and when the charged electric energy is predicted to reaches a lower limit due to discharging of the power storage apparatus, the controller charges power from the power network to the power storage apparatus in advance.

According to a second aspect of the control apparatus for the power storage apparatus, in the first aspect of the control apparatus for the power storage apparatus, when a steep increase in the overall consumed power of the customer is predicted based on the second predicted power, the controller discharges power from the power storage apparatus to the load apparatus at a moment of the steep increase in the overall consumed power of the customer. When a steep decrease in the overall consumed power of the customer is predicted based on the second predicted power, the controller charges power from the power network to the power storage apparatus at a moment of the steep decrease in the overall consumed power of the customer.

According to a third aspect of the control apparatus for the power storage apparatus, in the first or second aspect of the control apparatus for the power storage apparatus, when the overall consumed power of the customer in excess of a threshold power is predicted based on the second predicted power, the controller discharges power from the power storage apparatus to the load apparatus while the overall consumed power of the customer exceeds the threshold power.

According to a fourth aspect of the control apparatus for the power storage apparatus, in the first aspect of the control apparatus for the power storage apparatus, the customer is provided with a power generator apparatus that generates generated power.

According to a fifth aspect of the control apparatus for the power storage apparatus, in the fourth aspect of the control apparatus for the power storage apparatus, the controller is provided with: a third predictor that predicts third predicted power indicating temporal changes in the generated power over a time interval, and a fourth predictor that predicts fourth predicted power indicating temporal changes in the generated power over the third time period immediately after the current time. The control apparatus predicts temporal changes in charging power, discharging power, and charged electric energy of the power storage apparatus, based on the first predicted power to the fourth predicted power. When the charged electric energy is predicted to reach an upper limit due to charging of the power storage apparatus, the controller discharges power from the power storage apparatus to the load apparatus in advance.

According to a sixth aspect of the control apparatus for the power storage apparatus, in the fifth aspect of the control apparatus for the power storage apparatus, when a steep increase in a power difference, obtained by subtracting the generated power from the overall consumed power of the customer, is predicted based on the second predicted power and the fourth predicted power, the controller discharges power from the power storage apparatus to the load apparatus at a moment of the steep increase in the power difference. When a steep decrease in the power difference is predicted based on the second predicted power and the fourth predicted power, the controller charges power from the power network to the power storage apparatus at a moment of the steep decrease in the power difference.

According to a seventh aspect of the control apparatus for the power storage apparatus, in the fifth or sixth aspect of the control apparatus for the power storage apparatus, when a power difference, obtained by subtracting the generated power from the overall consumed power of the customer, in excess of a threshold power is predicted based on the second predicted power and the fourth predicted power, the controller discharges power from the power storage apparatus to the load apparatus while the power difference exceeds the threshold power.

According to the control apparatus for the power storage apparatus of an eighth aspect of in one of the fifth to seventh aspects of the control apparatus for the power storage apparatus, when that the generated power in excess of the overall consumed power of the customer is predicted based on the second predicted power and the fourth predicted power, the controller charges power from the power generator apparatus to the power storage apparatus while the generated power exceeds the overall consumed power of the customer.

According to a ninth aspect of the control apparatus for the power storage apparatus, in one of the fifth to eighth aspects of the control apparatus for the power storage apparatus, the power generator apparatus is a set of solar cells. The third and fourth predictors communicate with an external server apparatus, obtain weather data from the external server apparatus, and based on the weather data, predict third predicted power and fourth predicted power which are temporal changes in generated power of the solar cells, respectively.

According to a tenth aspect of the control apparatus for the power storage apparatus, in one of the first to ninth aspects of the control apparatus for the power storage apparatus, the second predictor has a neural network including an input layer into which time-series data indicating temporal changes in the overall consumed power of the customer over the second time period is inputted, at least one intermediate layer, and an output layer out of which time-series data indicating temporal changes in the overall consumed power of the customer over the first time period is outputted. The neural network is trained to indicate the second prediction model.

According to eleventh aspect of the control apparatus for the power storage apparatus of an in one of the first to tenth aspects of the control apparatus for the power storage apparatus, the second prediction model indicates temporal changes in the overall consumed power of the customer over the first time period before and after each of the plurality of load apparatuses is turned on.

According to a twelfth aspect of the control apparatus for the power storage apparatus, in one of the first to eleventh aspects of the control apparatus for the power storage apparatus, the control apparatus further is provided with a first prediction model generator that generates the first prediction model, and a second prediction model generator that generates the second prediction model.

According a thirteenth aspect of to the control apparatus for the power storage apparatus, in the twelfth aspect of the control apparatus for the power storage apparatus, the first and second prediction models are generated with reference to the consumed power of other customers.

According to a fourteenth aspect of the control apparatus for the power storage apparatus, in the twelfth or thirteenth aspect of the control apparatus for the power storage apparatus, the second prediction model is updated more frequently than the first prediction model.

According to a fifteenth aspect of the control apparatus for the power storage apparatus, in one of the first to fourteenth aspects of the control apparatus for the power storage apparatus, when setting charging power or discharging power based on the second predicted power, the controller sets an upper limit of the charging power or the discharging power based on the first predicted power.

According to a sixteenth aspect of the control apparatus for the power storage apparatus, in one of the first to fifteenth aspects of the control apparatus for the power storage apparatus, the controller communicates with an external server apparatus and obtains data of electricity costs from the external server apparatus. When an electricity cost exceeds a first threshold rate, the controller discharges power from the power storage apparatus to the load apparatus. When the electricity cost falls below a second threshold rate, the controller charges power from the power network to the power storage apparatus.

According to a seventeenth aspect of a power management system, a power management system for a customer connected to a power network is provided. The customer is provided with: a plurality of load apparatuses, at least one power storage apparatus, and the control apparatus according to in one of the first to sixteenth aspects of the control apparatus for the power storage apparatus.

According to eighteenth aspect of the control apparatus for the power storage apparatus of an a power grid management system for a power grid including a plurality of customers connected to a power network is provided. Each of the plurality of customers includes the power management system according to the seventeenth aspect of the power management system. The power grid further includes a server apparatus that controls the control apparatus of each of the customers to control transmitting and receiving of power among the plurality of customers.

INDUSTRIAL APPLICABILITY

According to the present disclosure, in a customer connected to a power network and having a plurality of load apparatuses and at least one power storage apparatus, it is possible to determine the amounts of charging power and discharging power of the power storage apparatus so as to reduce steep change in received power from the power network.

REFERENCE SIGNS LIST 1, 1A to 1C, 1A-1 to 1A-4: CUSTOMER
2: POWER NETWORK
2a: POWER LINE
3, 3A to 3D: SERVER APPARATUS
11, 11A: POWER DISTRIBUTION PANEL
12: POWER METER
13: POWER STORAGE APPARATUS
14: SENSOR
15-1, 15-2: LOAD APPARATUS
16, 16A to 16C: CONTROL APPARATUS
17: POWER GENERATOR APPARATUS
18, 19-1, 19-2: POWER METER
21, 21A to 21C: CONTROLLER
22, 22B: LONG-TERM PREDICTION MODEL GENERATOR (CONSUMED POWER)
23, 23B: LONG-TERM PREDICTOR (CONSUMED POWER)
24, 24B: SHORT-TERM PREDICTION MODEL GENERATOR (CONSUMED POWER)
25, 25B: SHORT-TERM PREDICTOR (CONSUMED POWER)
26: LONG-TERM PREDICTION MODEL GENERATOR (GENERATED POWER)
27: LONG-TERM PREDICTOR (GENERATED POWER)
28: SHORT-TERM PREDICTION MODEL GENERATOR (GENERATED POWER)
29: SHORT-TERM PREDICTOR (GENERATED POWER)
31: LEARNING MACHINE (ENTIRE CUSTOMER 1)
32: LEARNING MACHINE (INDIVIDUAL LOAD APPARATUSES 15)
33: DECISION MAKER
34: PATTERN RECOGNIZER
41: INPUT LAYER
42: INTERMEDIATE LAYER
43: OUTPUT LAYER
100, 100-1 to 100-4: POWER GRID
N1-1 to N1-P: NODE OF INPUT LAYER
N2-1 to N2-Q, N(M-1)-1 to N(M-1)-R: NODE OF INTERMEDIATE LAYER
NM-1 to NM-S: NODE OF OUTPUT LAYER

The invention claimed is:

1. A control apparatus for at least one power storage apparatus in a customer, the customer being connected to a power network and having a plurality of load apparatuses and the at least one power storage apparatus,
the control apparatus comprising:
a first predictor that predicts first predicted power using a first prediction model indicating temporal changes in overall consumed power of the customer over a time interval, the first predicted power indicating temporal changes in the overall consumed power of the customer;
a second predictor that predicts second predicted power using a second prediction model indicating temporal changes in the overall consumed power of the customer over a first time period before and after consumed power of each of the plurality of load apparatuses changes, the second predicted power being predicted based on temporal changes in the overall consumed power of the customer over a second time period immediately before a current time, the second predicted power indicating temporal changes in the overall consumed power of the customer over a third time period immediately after the current time; and
a controller that controls charging and discharging of the power storage apparatus so as to set a charging power or a discharging power every fourth time period based on the first predicted power, and set a charging power or a discharging power every fifth time period based on the second predicted power, the fifth time period being shorter than the third and fourth time periods,
wherein the controller predicts temporal changes in charging power, discharging power, and charged electric energy of the power storage apparatus, based on the first predicted power and the second predicted power, and when the charged electric energy is predicted to reaches a lower limit due to discharging of the power storage apparatus, the controller charges power from the power network to the power storage apparatus in advance.

2. The control apparatus as claimed in claim 1,
wherein, when a steep increase in the overall consumed power of the customer is predicted based on the second predicted power, the controller discharges power from the power storage apparatus to the load apparatus at a moment of the steep increase in the overall consumed power of the customer, and
wherein, when a steep decrease in the overall consumed power of the customer is predicted based on the second predicted power, the controller charges power from the power network to the power storage apparatus at a moment of the steep decrease in the overall consumed power of the customer.

3. The control apparatus as claimed in claim 1,
wherein, when the overall consumed power of the customer in excess of a threshold power is predicted based on the second predicted power,
the controller discharges power from the power storage apparatus to the load apparatus while the overall consumed power of the customer exceeds the threshold power.

4. The control apparatus as claimed in claim 1,
wherein the customer comprises a power generator apparatus that generates generated power.

5. The control apparatus as claimed in claim 4,
wherein the controller comprises:
a third predictor that predicts third predicted power indicating temporal changes in the generated power over a time interval, and
a fourth predictor that predicts fourth predicted power indicating temporal changes in the generated power over the third time period immediately after the current time, and
wherein the control apparatus predicts temporal changes in charging power, discharging power, and charged electric energy of the power storage apparatus, based on the first predicted power to the fourth predicted power, and
wherein, when the charged electric energy is predicted to reach an upper limit due to charging of the power storage apparatus, the controller discharges power from the power storage apparatus to the load apparatus in advance.

6. The control apparatus as claimed in claim 5,
wherein, when a steep increase in a power difference, obtained by subtracting the generated power from the overall consumed power of the customer, is predicted based on the second predicted power and the fourth predicted power, the controller discharges power from the power storage apparatus to the load apparatus at a moment of the steep increase in the power difference, and
wherein, when a steep decrease in the power difference is predicted based on the second predicted power and the fourth predicted power, the controller charges power from the power network to the power storage apparatus at a moment of the steep decrease in the power difference.

7. The control apparatus as claimed in claim 5 or 6,
wherein, when a power difference, obtained by subtracting the generated power from the overall consumed power of the customer, in excess of a threshold power is predicted based on the second predicted power and the fourth predicted power, the controller discharges power from the power storage apparatus to the load apparatus while the power difference exceeds the threshold power.

8. The control apparatus as claimed in claim 5,
wherein, when that the generated power in excess of the overall consumed power of the customer is predicted based on the second predicted power and the fourth predicted power, the controller charges power from the power generator apparatus to the power storage apparatus while the generated power exceeds the overall consumed power of the customer.

9. The control apparatus as claimed in claim 5,
wherein the power generator apparatus is a set of solar cells, and
wherein the third and fourth predictors communicate with an external server apparatus, obtain weather data from the external server apparatus, and based on the weather data, predict third predicted power and fourth predicted power which are temporal changes in generated power of the solar cells, respectively.

10. The control apparatus as claimed in claim 1,
wherein the second predictor has a neural network including an input layer into which time-series data indicating temporal changes in the overall consumed power of the customer over the second time period is inputted, at least one intermediate layer, and an output layer out of which time-series data indicating temporal changes in the overall consumed power of the customer over the first time period is outputted, and
wherein the neural network is trained to indicate the second prediction model.

11. The control apparatus as claimed in claim 1,
wherein the second prediction model indicates temporal changes in the overall consumed power of the customer over the first time period before and after each of the plurality of load apparatuses is turned on.

12. The control apparatus as claimed in claim 1,
wherein the control apparatus further comprises:
a first prediction model generator that generates the first prediction model, and
a second prediction model generator that generates the second prediction model.

13. The control apparatus as claimed in claim 12,
wherein the first and second prediction models are generated with reference to the consumed power of other customers.

14. The control apparatus as claimed in claim 12,
wherein the second prediction model is updated more frequently than the first prediction model.

15. The control apparatus as claimed in claim 1,
wherein, when setting charging power or discharging power based on the second predicted power, the controller sets an upper limit of the charging power or the discharging power based on the first predicted power.

16. The control apparatus as claimed in claim 1,
wherein the controller communicates with an external server apparatus and obtains data of electricity costs from the external server apparatus,
wherein, when an electricity cost exceeds a first threshold rate, the controller discharges power from the power storage apparatus to the load apparatus, and
wherein, when the electricity cost falls below a second threshold rate, the controller charges power from the power network to the power storage apparatus.

17. A power management system for a customer connected to a power network,
wherein the customer comprises:
a plurality of load apparatuses,
at least one power storage apparatus, and
a control apparatus for the at least one power storage apparatus,
wherein the control apparatus comprising:
a first predictor that predicts first predicted power using a first prediction model indicating temporal changes in overall consumed power of the customer over a time interval, the first predicted power indicating temporal changes in the overall consumed power of the customer;
a second predictor that predicts second predicted power using a second prediction model indicating temporal changes in the overall consumed power of the customer over a first time period before and after consumed power of each of the plurality of load apparatuses changes, the second predicted power being predicted based on temporal changes in the overall consumed power of the customer over a second time period immediately before a current time, the second predicted power indicating temporal changes in the overall consumed power of the customer over a third time period immediately after the current time; and
a controller that controls charging and discharging of the power storage apparatus so as to set a charging power or a discharging power every fourth time period based on the first predicted power, and set a charging power or a discharging power every fifth time period based on the second predicted power, the fifth time period being shorter than the third and fourth time periods,
wherein the controller predicts temporal changes in charging power, discharging power, and charged electric energy of the power storage apparatus, based on the first predicted power and the second predicted power, and when the charged electric energy is predicted to reaches a lower limit due to discharging of the power storage apparatus, the controller charges power from the power network to the power storage apparatus in advance.

18. A power grid management system for a power grid including a plurality of customers connected to a power network,
wherein each of the plurality of customers includes a power management system, and
wherein each of the customers comprises:
a plurality of load apparatuses, at least one power storage apparatus, and
a control apparatus for the at least one power storage apparatus,
wherein the control apparatus comprising:
a first predictor that predicts first predicted power using a first prediction model indicating temporal changes in overall consumed power of the customer over a time interval, the first predicted power indicating temporal changes in the overall consumed power of the customer;
a second predictor that predicts second predicted power using a second prediction model indicating temporal changes in the overall consumed power of the customer over a first time period before and after consumed power of each of the plurality of load apparatuses changes, the second predicted power being predicted based on temporal changes in the overall consumed power of the customer over a second time period immediately before a current time, the second predicted power indicating temporal changes in the overall consumed power of the customer over a third time period immediately after the current time; and
a controller that controls charging and discharging of the power storage apparatus so as to set a charging power or a discharging power every fourth time period based on the first predicted power, and set a charging power or a discharging power every fifth time period based on the second predicted power, the fifth time period being shorter than the third and fourth time periods,
wherein the controller predicts temporal changes in charging power, discharging power, and charged electric energy of the power storage apparatus, based on the first predicted power and the second predicted power, and when the charged electric energy is predicted to reaches a lower limit due to discharging of the power storage apparatus, the controller charges power from the power network to the power storage apparatus in advance, and
wherein the power grid further includes a server apparatus that controls the control apparatus of each of the customers to control transmitting and receiving of power among the plurality of customers.

* * * * *